United States Patent
Harrell et al.

(10) Patent No.: US 7,912,183 B2
(45) Date of Patent: Mar. 22, 2011

(54) METHODS, SYSTEMS, AND COMPUTER PROGRAM PRODUCTS FOR PROVIDING NETWORK OUTAGE INFORMATION

(75) Inventors: Aaron Harrell, Charlotte, NC (US); Jackie Walker, Jr., Charlotte, NC (US); John Jopp, Kannapolis, NC (US); Roy Allen, Cherryville, NC (US); Kirk Brown, Concord, NC (US); Joel Wilson, Olin, NC (US); Barron Cain, Roswell, GA (US); Thomas Prange, Salisbury, NC (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1199 days.

(21) Appl. No.: 11/545,651

(22) Filed: Oct. 9, 2006

(65) Prior Publication Data
US 2008/0086661 A1    Apr. 10, 2008

(51) Int. Cl.
*H04M 1/24*    (2006.01)
*H04M 3/08*    (2006.01)
*H04M 3/22*    (2006.01)

(52) U.S. Cl. .................... 379/9.03; 379/9.04; 379/14.01; 379/15.01; 379/22.04; 379/29.05

(58) Field of Classification Search ............... 379/1.01, 379/9, 9.02, 9.03, 9.04, 14, 14.01, 10.01, 379/15.01, 15.04, 15.05, 22.04, 22.05, 24, 379/25, 27.04, 29.05, 29.09, 29.1, 32.01; 370/242, 252

See application file for complete search history.

(56) References Cited

U.S. PATENT DOCUMENTS

| | | | |
|---|---|---|---|
| 5,802,144 | A | 9/1998 | Laird et al. |
| 5,920,257 | A | 7/1999 | Commerford |
| 6,604,137 | B2 | 8/2003 | Cowan et al. |
| 7,010,437 | B2 | 3/2006 | Lubkeman et al. |
| 7,093,284 | B2 | 8/2006 | Hildenbrand, Jr. et al. |
| 7,259,666 | B1 * | 8/2007 | Hermsmeyer et al. ........ 340/517 |
| 7,826,597 | B2 * | 11/2010 | Berner et al. ................ 379/1.01 |
| 2003/0163721 | A1 | 8/2003 | Hildenbrand, Jr. et al. |
| 2004/0021577 | A1 | 2/2004 | Lelecas |
| 2004/0058669 | A1 | 3/2004 | Carmon et al. |
| 2004/0061616 | A1 | 4/2004 | Fischer et al. |
| 2004/0086087 | A1 | 5/2004 | Gonsalves et al. |
| 2004/0102873 | A1 | 5/2004 | Stark et al. |

(Continued)

OTHER PUBLICATIONS

U.S. Appl. No. 11/546,686, "Methods, Systems, And Computer Program Products For Generating Network Outage Reports" by BellSouth Intellectual Property Corporation.

*Primary Examiner* — Binh K Tieu
(74) *Attorney, Agent, or Firm* — Cantor Colburn LLP

(57) ABSTRACT

Exemplary embodiments relate to methods, systems, user devices and computer program products for providing network status information. Methods include receiving alarm data for an event from a plurality of sources. The alarm data includes a plurality of alarm records each including a site identifier. The alarm data is processed to create report data. The processing includes assigning an attribute of failed to each of the site identifiers that are specified in more than a threshold number of the alarm records. The report data comprises at least digital loop carrier information. The report data is transmitted to a mechanized loop test (MLT) testing system capable of generating MLT test results. The MLT test results are used to adjust the digital loop carrier information included in the report data, wherein the digital loop carrier information specifies a quantity of digital carrier loop lines that are out of service.

20 Claims, 28 Drawing Sheets

U.S. PATENT DOCUMENTS

| | | |
|---|---|---|
| 2004/0203428 A1 | 10/2004 | Vance |
| 2005/0096856 A1 | 5/2005 | Lubkeman et al. |
| 2005/0149835 A1 | 7/2005 | Dacosta |
| 2005/0216421 A1* | 9/2005 | Barry et al. ............ 705/64 |
| 2005/0259573 A1 | 11/2005 | Gonsalves et al. |
| 2006/0055549 A1 | 3/2006 | Fischer et al. |

* cited by examiner

ALARM
- ALARM TYPE
- SITE IDENTIFIER
- SITE TYPE
- EQUIPMENT TYPE
- DATE
- TIME
- TICKET NUMBER

*FIG. 3*

Storm Reporter

NRC Storm Reporter

Last Data Update At: 14:07 06,02,2004 Central Time

Home | DLC Power | Filters | Weather | Login
Broadband | CO Power | MDR Districts For State: North Carolina        TIME of REPORT: 14:07 06,02,2004 Central Time

| CLLX | System | Type | Condition | Alarm | Ticket # | Date | Time |
|---|---|---|---|---|---|---|---|
| dlisncu0015 | 704 922 slc5 5646 | MJ | SA | dlc no com | ez1fb | 05/24/2004 | 08:47:00 |
| dlisncu0015 | env 01 cab.03a env5 | MN | SA | rtacpwr | ez25t | 05/24/2004 | 14:20:00 |
| dlisncu0015 | 704 922 96s51 5638 | MJ | SA | dlc no com | ez1fc | 05/24/2004 | 08:47:00 |
| hmpsncu0015 | env 01 cab.06a env-2 | MN | SA | rtacpwr | fb2k1 | 06/02/2004 | 11:56:00 |
| hsvlncu0010 | env 02cab.02a env-2 | MN | SA | rtacpwr | cu2xn | 03/19/2004 | 14:57:00 |
| vnslncu0030 | cab 1 | MN | SA | rtacpwr | em4lz | 05/12/2004 | 13:40:00 |

Red color cell indicates this is a critical site.

Save as Excel

<< back

FIG. 6

DESS Detailed Data

For FL_UNKNOWN

TIME of REPORT: 08/03/2005 14:37 Central

12 Sites on Batteries

| Area/Turf | CLLI | Count |
|---|---|---|
| SO_PalmSouth | BCRTFLAZH03 | 1 |
| SO_PalmSouth | BCRTFLU0204 | 1 |
| UNKNOWN | DYBHFLU0027 | 1 |
| NO_JaxNo | JCVLFLU0293 | 2 |
| NO_Sanford | LKMRFLU0049 | 1 |
| SO_NoDade | MIAMFLU0274 | 1 |
| NO_DytOcean | NSBHFLU0050 | 1 |
| NO_Orlando | ORLDFLU0033 | 1 |
| NO_PanamaCity | PCBHFLU0015 | 1 |
| NO_PalmNorth | STRTFLU0020 | 1 |
| NO_Orlando | WNPKFLHQH02 | 1 |
| NO_Brevard | WSMLFLU0001 | 1 |

0 Sites Failed

| Area/Turf | CLLI | Count |
|---|---|---|

[Save as Excel]

*FIG. 7*

Pre-Built Filters

NRC Storm Reporter

Last Data Update At: 14:37 06,02,2004 Central Time

Home | DLC Power | Filters | Weather | Login

Broadband | CO Power | MDR Districts

| Filter Name | | State |
|---|---|---|
| AL DESS | Modify/Run | AL |
| AL totals | Modify/Run | AL |
| FL DESS | Modify/Run | FL |
| FL totals | Modify/Run | FL |
| GA DESS | Modify/Run | GA |
| GA totals | Modify/Run | GA |
| KY DESS | Modify/Run | KY |
| KY totals | Modify/Run | KY |
| LA DESS | Modify/Run | LA |
| LA totals | Modify/Run | LA |
| MS DESS | Modify/Run | MS |
| MS totals | Modify/Run | MS |
| NC DESS | Modify/Run | NC |
| NC totals | Modify/Run | NC |
| SC DESS | Modify/Run | SC |
| SC totals | Modify/Run | SC |
| TN DESS | Modify/Run | TN |
| TN totals | Modify/Run | TN |

*Type column: all "Power Reporter"*

<<back

METHODS, SYSTEMS, AND COMPUTER PROGRAM PRODUCTS FOR PROVIDING NETWORK OUTAGE INFORMATION

BACKGROUND

Exemplary embodiments relate generally to networks, and more particularly, to methods, systems and computer program products for providing network outage information.

Network providers strive to provide high levels of network reliability and quality of service to their customers. During system failure situations, such as those encountered during storms, workers in the field and others are aided in performing network verification and recovery by utilizing related outage information. Storm related outage information, for example, may include information such as remote terminal/digital loop carrier (RT/DLC) system failures, digital loop carriers (DLCs) without commercial power, failed asymmetric digital subscriber line (ADSL) equipment, broadband customer out of service (OOS), simplex and failed carrier systems, signaling system seven (SS7) links affected, and central offices (COs) on emergency generator or battery power. Some of this information is required by the network provider in order to advise the Federal Communication Commission (FCC) of the amount of damage to the network provider property and to inform the FCC of the effects on customer service.

Typically, storm related outage information for a network is gathered using a variety of automated and non-automated methods. In the past, alarm data was printed and examined line-by-line by numerous individuals to determine equipment status. A summary was created and faxed or emailed to field workers. This process was primarily manual and time consuming. For a large network provider, the fax could become over seventy-five pages in length. In addition, the individuals examining the alarm data were not always using the same criteria and therefore, inconsistencies would occur in the reporting of equipment status.

Today, determining equipment status has been automated in some respects. For example, commercial software packages such as the Telcordia NMA System, provides monitoring and analysis of problems on various types of networks. In addition, network providers may have one or more internally developed software applications providing other types of reporting data related to system alarms and outages. Currently, this may require employees of the network provider to look at two or more sources of data and/or to manually enter the data for consolidation into a single report for the field employees performing the trouble shooting and repair. It would be desirable to have an automated system that collects data from a variety of monitoring and analysis software systems to provide a consolidated report. In addition, it would be desirable to have access to both summary and detailed alarm data in order to track system outage information.

SUMMARY

Exemplary embodiments relate to methods, systems, and computer program products for providing network status information. Methods include receiving alarm data for an event from a plurality of sources. The alarm data includes a plurality of alarm records each including a site identifier. The alarm data is processed to create report data, wherein the report data comprises at least digital loop carrier information. The processing includes assigning an attribute of failed to each of the site identifiers that are specified in more than a threshold number of the alarm records. The report data is transmitted to an MLT testing system capable of generating MLT test results. The MLT test results are used to adjust the report data in order to improve the accuracy of digital loop carrier information included in the report data. The digital loop carrier information specifies a quantity of digital carrier loop lines that are out of service.

Systems for providing network status information include a storage device and a processor in communication with the storage device. The processor includes computer instructions for facilitating receiving alarm data for an event from a plurality of sources. The alarm data includes a plurality of alarm records each including a site identifier. The processor also includes instructions for processing the alarm data to create report data, wherein the report data comprises at least digital loop carrier information. The processing includes assigning an attribute of failed to each of the site identifiers that are specified in more than a threshold number of the alarm records. The report data is stored on the storage device. The processor transmits report data to a mechanized loop test (MLT) testing system capable of generating MLT test results. The processor uses the MLT test results to adjust digital loop carrier information included in the report data. The digital loop carrier information specifies a quantity of digital carrier loop lines that are out of service.

Computer program products for providing network status information include a storage medium readable by a processing circuit and storing instructions for execution by the processing circuit for facilitating a method. The method includes receiving alarm data for an event from a plurality of sources. The alarm data includes a plurality of alarm records each including a site identifier. The alarm data is processed to create report data, wherein the report data comprises at least digital loop carrier information. The processing includes assigning an attribute of failed to each of the site identifiers that are specified in more than a threshold number of the alarm records. The report data is transmitted to an MLT testing system capable of generating MLT test results. The MLT test results are used to adjust the digital loop carrier information included in the report data. The digital loop carrier information specifies a quantity of digital carrier loop lines that are out of service.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 3 depicts exemplary attributes for alarm data;

FIG. 6 is an exemplary user interface for a detailed report for all digital loop carriers (DLCs) in a selected state;

FIG. 7 is an exemplary user interface for DLCs failed or on batteries;

FIG. 9 is an exemplary user interface for viewing a list of predefined filters/reports;

FIG. 13 is an exemplary user interface for searching alarms by entity type;

FIG. 25 is an exemplary user interface for displaying information about offices with failed telemetry;

DETAILED DESCRIPTION OF EXEMPLARY EMBODIMENTS

Exemplary embodiments are directed to network outage reporting. Although the description below is directed to outages caused by storms, it should be appreciated that the invention is applicable to any type of network outage, e.g., outage due to construction, etc.

According to exemplary embodiments, alarm data collection and site status determination are performed in an expeditious manner. The status of a particular site may be utilized to assign network provider field resources and/or to provide status updates to the Federal Communications Commission (FCC) and other government agencies. Exemplary embodiments collect and process selected alarm data to determine the number and nature of the alarms. The results may be output in several formats including: a totals view report which contains summary information for several types of equipment; a totals view report which contains summary information about a particular type of equipment (e.g., a digital loop carrier (DLC) totals view report); a detailed view report that contains detailed information for several types of equipment (e.g. a digital equipment systems specialist (DESS) detailed view report); and a detailed view that contains detailed information for a particular type of equipment. In addition, custom and on-demand reports may be provided along with links to weather information and administrative tools.

Exemplary embodiments provide the ability to summarize network carrier equipment status and other storm related alarm information in one location. For example, the network carrier equipment status could refer to the status of a DLC. The status of DLCs may be critical for emergency generator deployment. In addition, the network provider has the ability to create virtually real time reports (e.g., within a user modifiable period of time from the creation of the alarms) for equipment restoration as well as reporting purposes.

Figure 1:
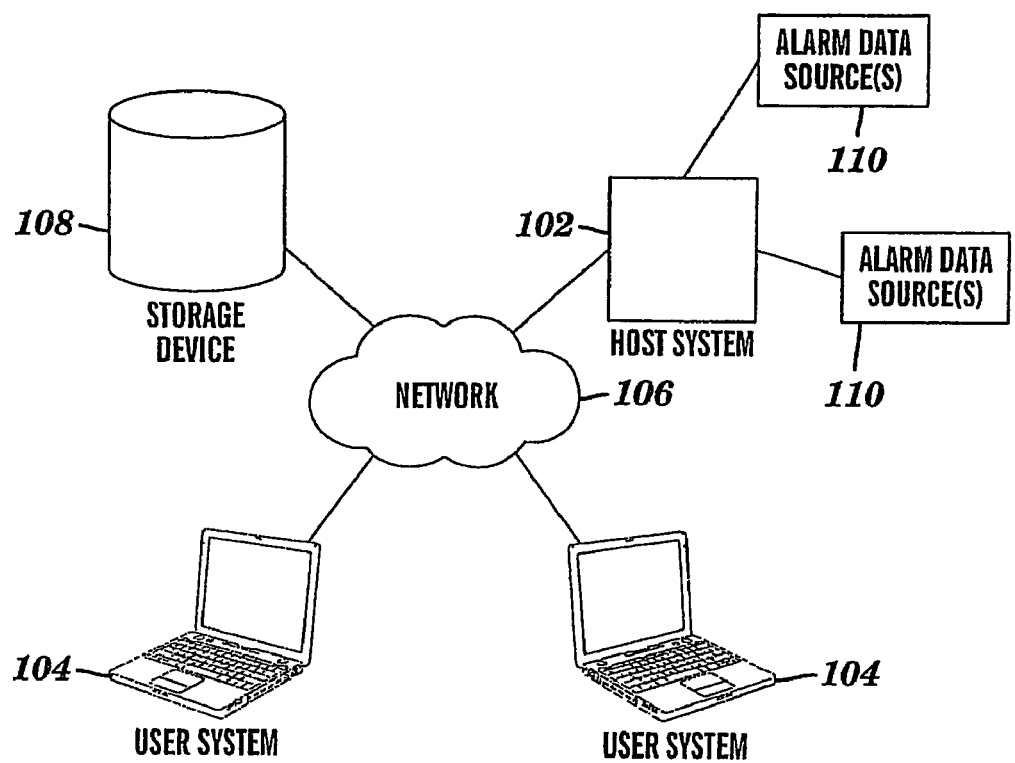
FIG. 1 is a block diagram of an exemplary system that may be utilized to provide consolidated storm outage information.

FIG. 1 is a block diagram of an exemplary system that may be utilized to provide consolidated storm outage information for a provider network. The system depicted in FIG. 1 includes one or more user systems 104, through which users at one or more geographic locations may contact the host system 104 to perform the storm reporting. The user systems 104 (also referred to herein as user devices) may be utilized to display the user interfaces, such as those depicted in FIGS. 4-18. The host system 102 executes computer instructions for implementing receiving and/or retrieving storm data, processing the alarm data to create report data and generating reports based on the report data as described herein (see for example, FIG. 2 and the accompanying description). The user systems 104 are coupled to the host system 102 via a network 106. Each user system 104 may be implemented using a general-purpose computer executing a computer program for carrying out the processes described herein. The user systems 104 may be implemented by personal computers and/or host attached terminals. If the user systems 104 are personal computers (e.g., laptop, personal digital assistant), the processing described herein may be shared by a user system 104 and the host system 102 (e.g., by providing an applet to the user system).

The alarm data sources 110 may include commercially available network monitoring software such as the Telcordia NMA System and/or software created specifically for an/or by the network provider. In exemplary embodiments, all of the error data is generated by a single alarm data source. In alternate exemplary embodiments, different kinds of errors are generated by different alarm data sources 110. In addition, errors for different kinds of conditions and/or equipment may be generated by different alarm data sources 110. For example, alarms relating to DLC equipment may be received from an alarm data source 110 such as the Telcordia NMA System and alarms relating to asymmetric digital subscriber lines (ADSLs) may be received from an alarm data source 110 that was developed and is specific to the network provider. In addition, the alarm data sources 110 may be directly connected to the host system 102 (as depicted in FIG. 1) or via a network 106.

The network 106 may be any type of known network including, but not limited to, a wide area network (WAN), a local area network (LAN), a global network (e.g. Internet, cellular), a virtual private network (VPN), and an intranet. The network 106 may be implemented using a wireless network or any kind of physical network implementation. A user system 104 may be coupled to the host system through multiple networks (e.g., intranet and Internet) so that not all user systems 104 are coupled to the host system 102 through the same network. One or more of the user systems 104 and the host system 102 may be connected to the network 106 in a wireless fashion.

The storage device 108 includes the report data (both current and historical) and any other data related to the storm reporting (e.g., time of last update). The storage device 108 may be implemented using a variety of devices for storing electronic information. It is understood that the storage device 108 may be implemented using memory contained in the host system 102, a user system 104, or it may be a separate physical device. The storage device 108 is logically addressable as a consolidated data source across a distributed environment that includes a network 106. Information stored in the storage device 108 may be retrieved and manipulated via the host system 102 and/or via one or more user systems 104. In exemplary embodiments, the host system 102 operates as a database server and coordinates access to report data including data stored on the storage device 108.

The host system 102 depicted in FIG. 1 may be implemented using one or more servers operating in response to a computer program stored in a storage medium accessible by the server. The host system 102 may operate as a network server (e.g., a web server) to communicate with the user systems 104. The host system 102 handles sending and receiving information to and from the user system 104 and can perform associated tasks. The host system 102 may also include a firewall to prevent unauthorized access to the host system 102 and enforce any limitations on authorized access. A firewall may be implemented using conventional hardware and/or software in a manner those skilled in the art would appreciate.

The host system 102 may also operate as an application server. The host system 102 executes one or more computer programs to perform the processing and reporting described herein (see for example, FIG. 2). Processing may be shared by the user system 104 and the host system 102 by providing an application (e.g., java applet) to the user system 104.

Alternatively, the user system 104 can include a standalone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
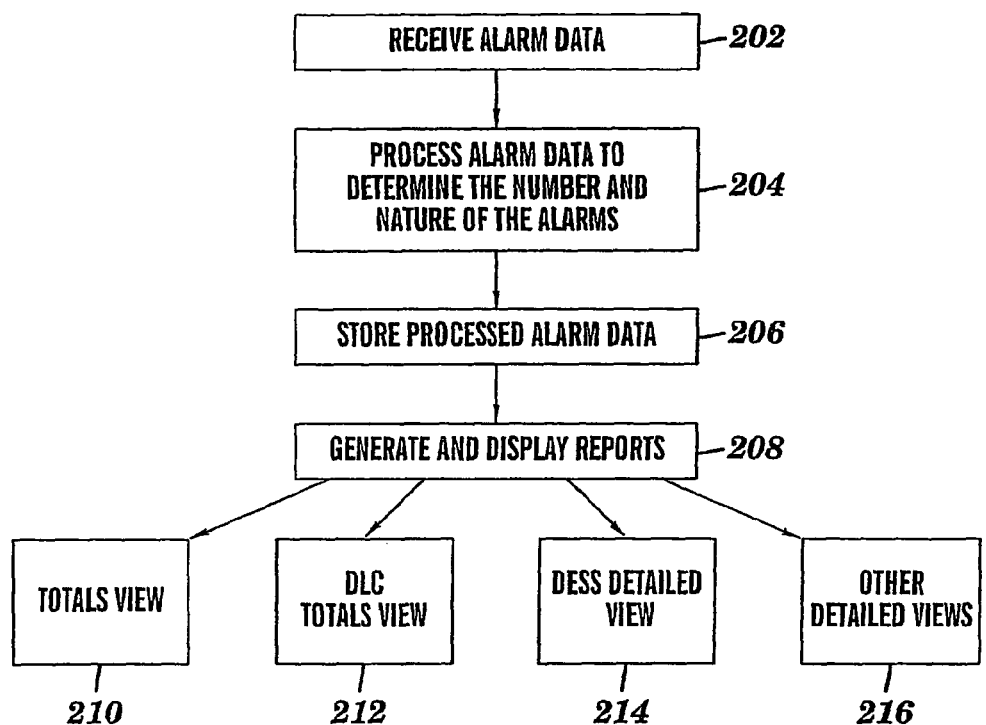
FIG. 2 is a flow diagram of an exemplary process for providing consolidated storm outage information.

FIG. 2 is a flow diagram of an exemplary process for providing consolidated storm outage information. At block 202, alarm data from alarm data source(s) 110 is received at a host system 102. In exemplary embodiments, the alarm data is received in response to a request from the host system 102, in alternate embodiments, the alarm data source(s) 110 automatically send data on a periodic basis or in response to an event occurring (e.g., a new alarm). At block 204, the alarm data is processed to determine the number and nature of the alarms. At block 206, the processed alarm data (also referred to herein as report data) is stored in the storage device 108.

At block 208 in FIG. 2, reports are generated and displayed (e.g., on user systems 104 via the user interfaces described herein). In exemplary embodiments, the reports are generated and displayed in response to a particular request from a requestor. In alternate embodiments, the reports are generated automatically and displayed in response to a particular request from a requester. In exemplary embodiments, the reports include, but are not limited to: a totals view report 210 which contains summary information for several types of equipment; a DLC totals view report 212 which contains summary information for DLC equipment; a DESS detailed view report 214 that includes detailed information for several types of equipment and other detailed view reports 216 that contain detailed information for a particular type of equipment (e.g., signaling system seven (SS7), DLC, digital subscriber line access mutiplexer (DSLAM)).

FIG. 3 depicts exemplary attributes for alarm data. In exemplary embodiments, the alarm data attributes include: alarm type (e.g., out of service, power outage, on batteries, on engines and critical); site identifier (which correlates to one geographic regions such as turf and state); site type (e.g., central office (CO), customer and carrier); equipment type (e.g., DLC, ADSL, simplex, SS7, DSLAM); date; time and ticket number (FWG has been assigned to fix the alarm condition). In exemplary embodiments, the site identifier is the common language location identifier (CLLI), a unique site identifier. The attributes depicted in FIG. 3 are meant to be exemplary in nature and any attributes collected by alarm data sources 110 may be added to the alarm data attributes.

Figure 4:
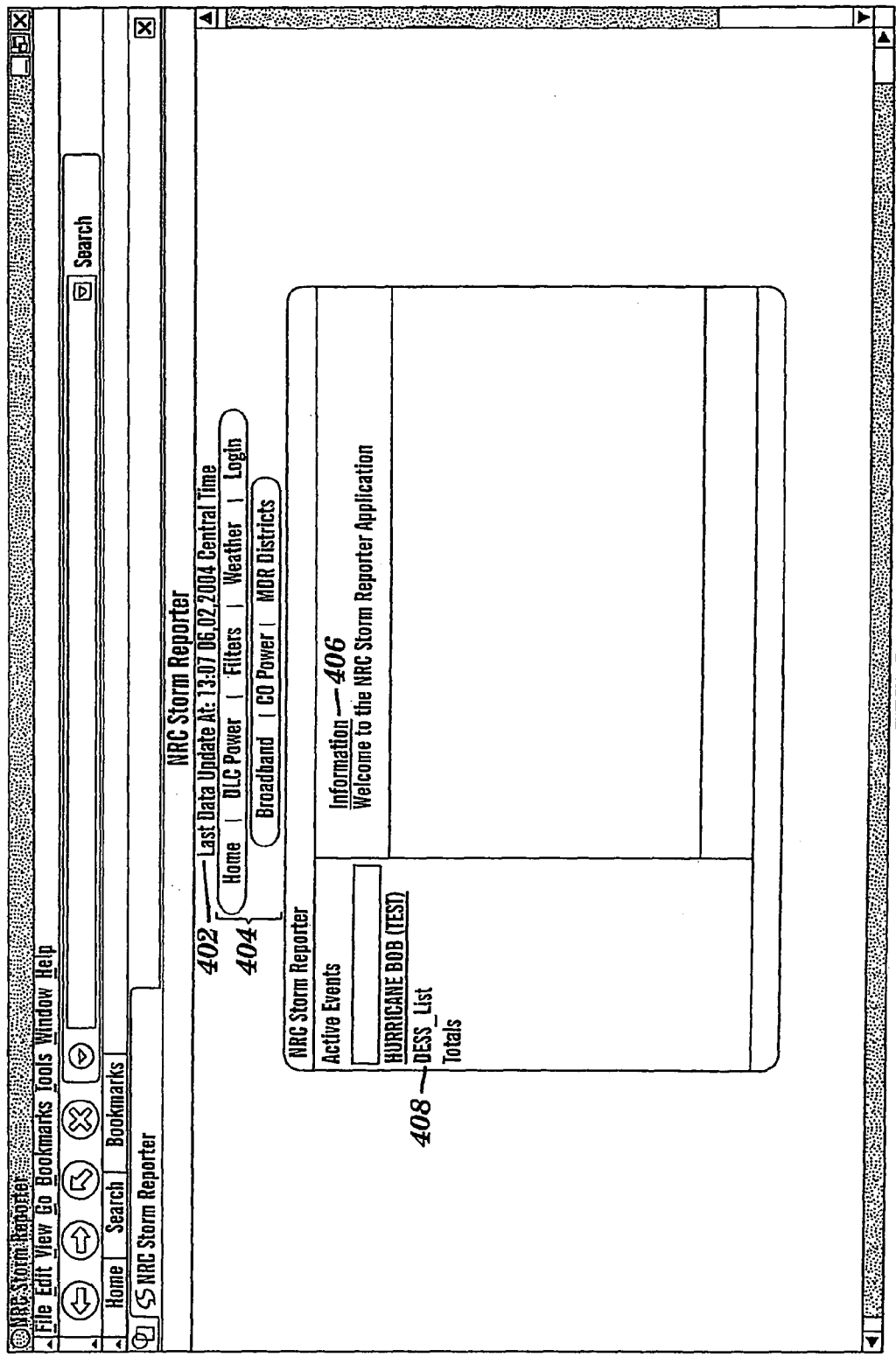
FIG. 4 is an exemplary user interface for a home page for a storm reporter system.

FIG. 4 is an exemplary user interface for a home page for a storm reporter system. The storm reporter system may be utilized by network provider personnel such as network reliability center (NRC) staff, field work groups (FWGs), DESSs and other network personnel to determine equipment (e.g., DLC) status (e.g., loss of commercial power and/or failed sites). In addition, exemplary embodiments may be utilized to search ticket number data for central office engine transfer and battery discharge alarms to be included on a summary report. Further, ADSL information may be retrieved and included in the summary report. Exemplary embodiments are utilized to communicate this information to various organizations primarily during an emergency situation (e.g., hurricane) but may be used at any time that weather or other events have the potential to cause provider network outages.

As depicted in FIG. 4, the home page includes the date and time of the last data collection 402. In exemplary embodiments, the alarm data is collected every thirty minutes. The navigation buttons 404 (home, DLC power, filters, weather, login, broadband, CO power and MDR districts) will be discussed further herein. The information section 406 is utilized to publish relevant information such as "the eye of the storm is expected to make landfall near Charleston, S.C. at 7 AM" or "the emergency control center (ECC) conference call is scheduled for this afternoon at 5 PM EST." The active events section 408 contains links to a predefined filter for a named event. The "totals" link opens up a summary for a given state such as the one depicted in FIG. 5 below. The "DESS_list" link opens up a DESS alarm view such as the one depicted in FIG. 6 below. In alternate exemplary embodiments, the main page includes access to a notepad associated with a particular storm event (also referred to herein as an event). The notepad may be utilized to record significant events, dates and times associated with the storm event as well as FWG names and numbers.

Figure 5:
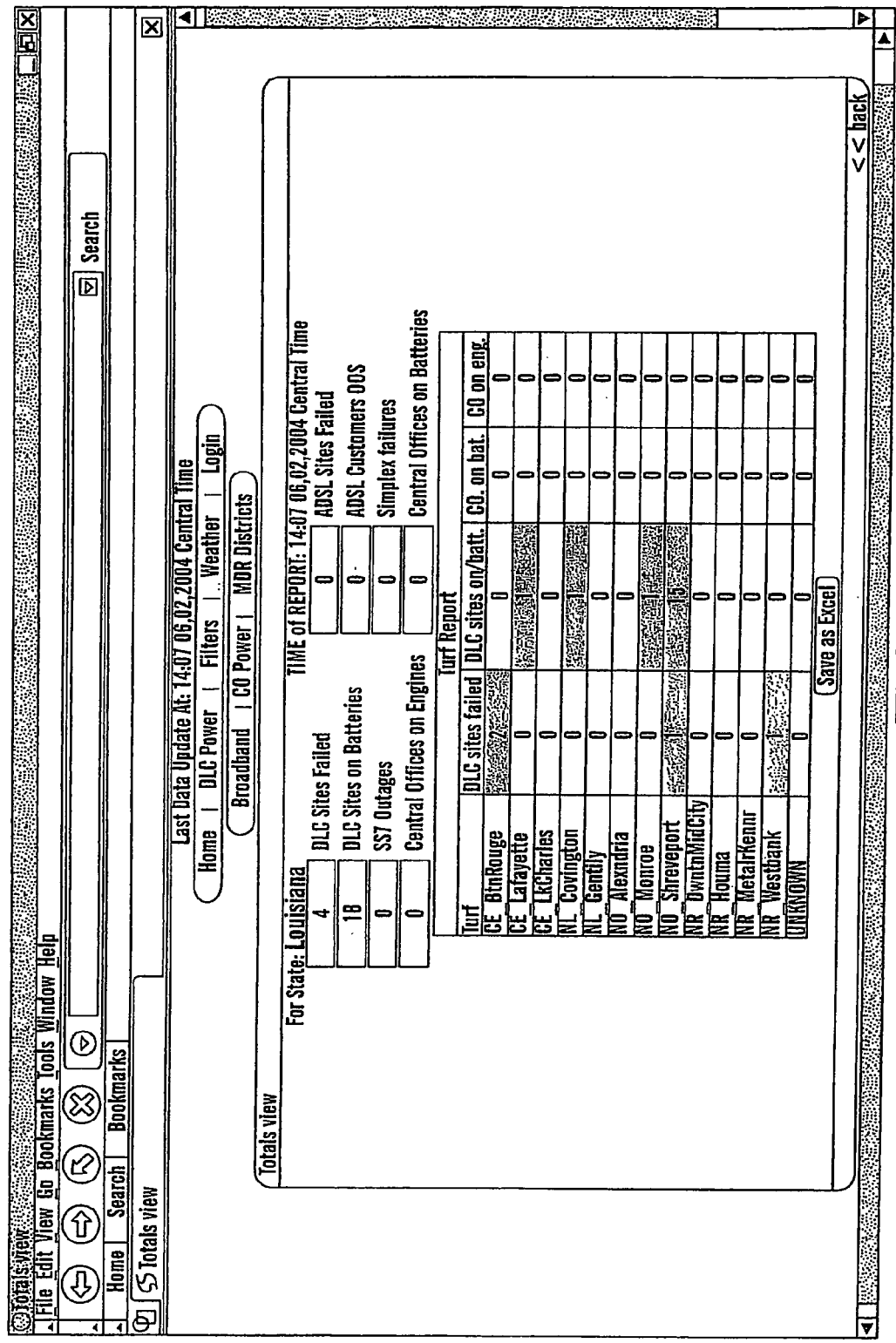
FIG. 5 is an exemplary user interface for a summary report for a selected state.

FIG. 5 is an exemplary user interface for a summary report for a selected state. The totals page depicted in FIG. 5 contains: DLC sites failed, DLC sites on batteries, COs on emergency generator or batteries, ADSL sites failed, ADSL customers out of service (OOS), SS7 outages, and simplex or failed interoffice carrier failures. The turf report table lists the DLCs, ADSLs and CO information by turf. A turf represents a geographic location and each state typically contains more than one turf. Each turf may be serviced by a different FWG. At the bottom of this user interface is a link to save the information, for example, into an Excel spreadsheet.

If the number of alarms at a particular site (identified by a site identifier) is more than a threshold (user modifiable)

number of alarms (e.g., one, three, five), then an attribute of "failed" is associated with the site. In addition, sites without power for over twenty-four hours (number is user modifiable) may be highlighted, for example, in blue text.

FIG. 6 is an exemplary user interface for a detailed report for all DLCs in a selected state. A similar report may be created for other equipment types, such as all ADSLs or SS7s in a particular state or turf. FIG. 6, lists all DLC alarms as well as the date and time that the alarm came in, the alarm type and an NMA ticket number (e.g., from the NMA system discussed previously). The NMA ticket number is a unique 5 character code assigned by NMA to each alarm(s) that have reached a threshold. NMA ticket number is used to reference alarms. In exemplary embodiments, if a site has an alarm type of "rtacpwr" (power outage, or outage) or "rtaccrit" (critical) then it will be displayed in red lettering. Again, there is a link at the bottom of the page to save the data, in this case in an Excel spreadsheet. The code common language location identifier (CLLI) in FIG. 6 identifies physical locations and equipment such as buildings, COs, and antennas. In exemplary embodiments the CLLI is utilized as the site identifier.

The system column in FIG. 6 refers to DLC cabinet or NPA/NXX or system number. The type refers to critical or major or minor alarm. The condition refers to service affecting or non-service affecting alarm. The alarm refers to the alarm type and include values such as, but not limited to: out of service, power outage, on batteries, on engines and critical.

Figure 8:
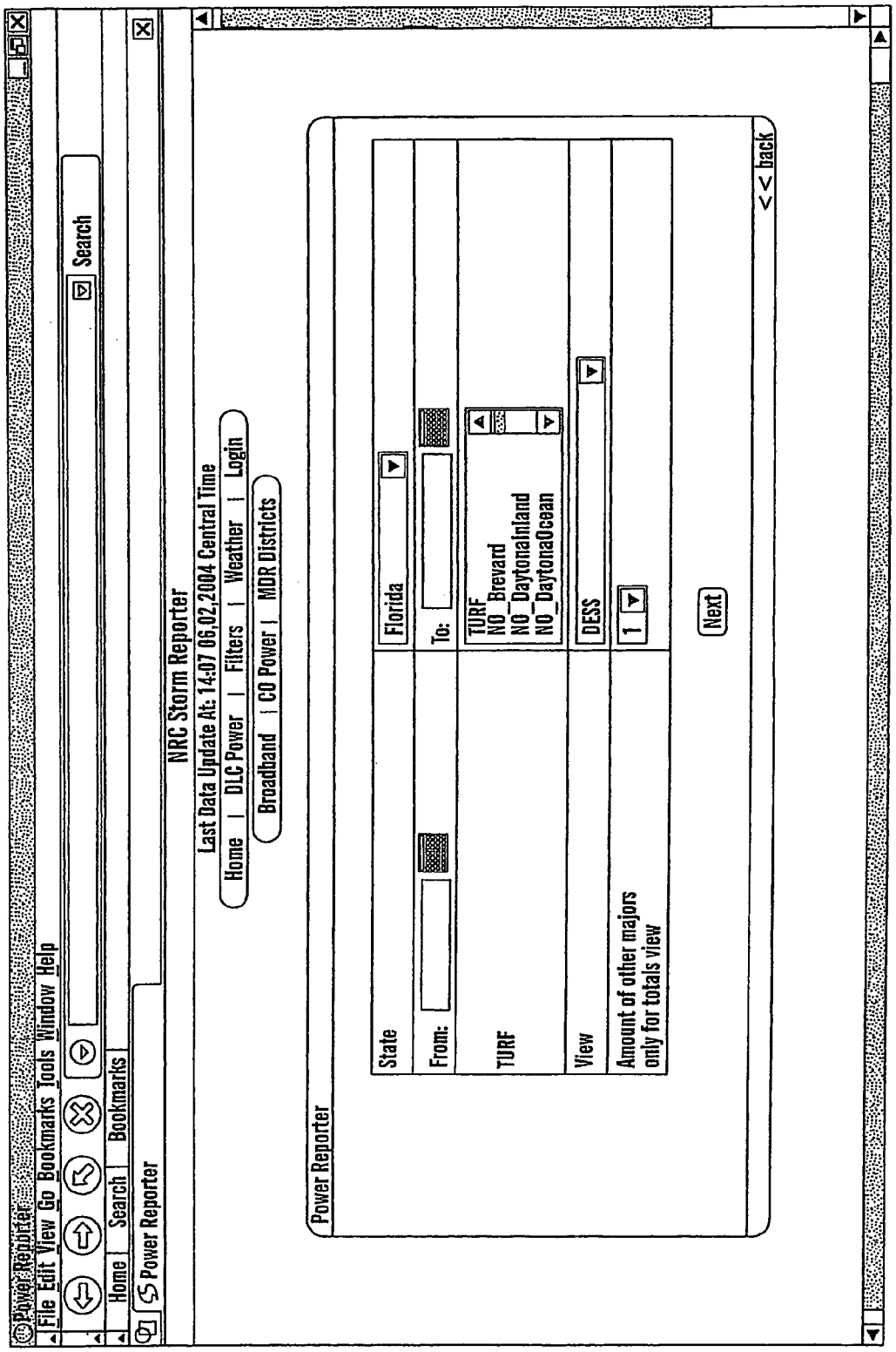
FIG. 8 is an exemplary user interface for viewing DLC alarms.

FIG. 7 is an exemplary user interface for DLCs failed or on batteries or failed. FIG. 8 is an exemplary user interface for viewing DLC alarms that are presented to the requester after the requester selects the DLC power navigation button 404 on FIG. 4. This DLC power link allows a requester, via a user system 104, to view DLC alarms. The requester selects a state, a start and end date (if no dates are specified then all dates will be pulled), a turf(s) desired (if none are selected all will be pulled), either DESS or sites failed/on batteries for view, the amount of other majors (this is the number of additional alarms the program uses to determine if a site is failed). For example, if the amount of other majors is 1, then an error type of "rtacpwr" plus one other alarm (may require a major type of alarm) for that site to be counted as failed. A major alarm refers to a service affecting alarm condition.

FIG. 9 is an exemplary user interface for viewing a list of predefined filters/reports that is presented to the requester after the requester selects the filters navigation button 404 on FIG. 4. Two filters/reports are defined for each state: a DESS report for detailed analysis, and a totals report. The requester, with the proper authority, may initiate the execution of any of these filters/reports. The requester is presented with a link to a national weather service website when the weather navigation button 404 on FIG. 4 is selected. In addition, the requester is presented with a logon screen (for access to advanced features such as the building of filters, events, information, text, etc.) when the login navigation button 404 is selected on FIG. 4. Most requesters will not require access to the advanced features. Further, the requester is presented with the detailed ADLS alarm data when the requester selects the broadband navigation button 404 on FIG. 4. In exemplary embodiments, the ADSL alarm data is automatically retrieved (or received) from a network monitoring system.

Figure 10:
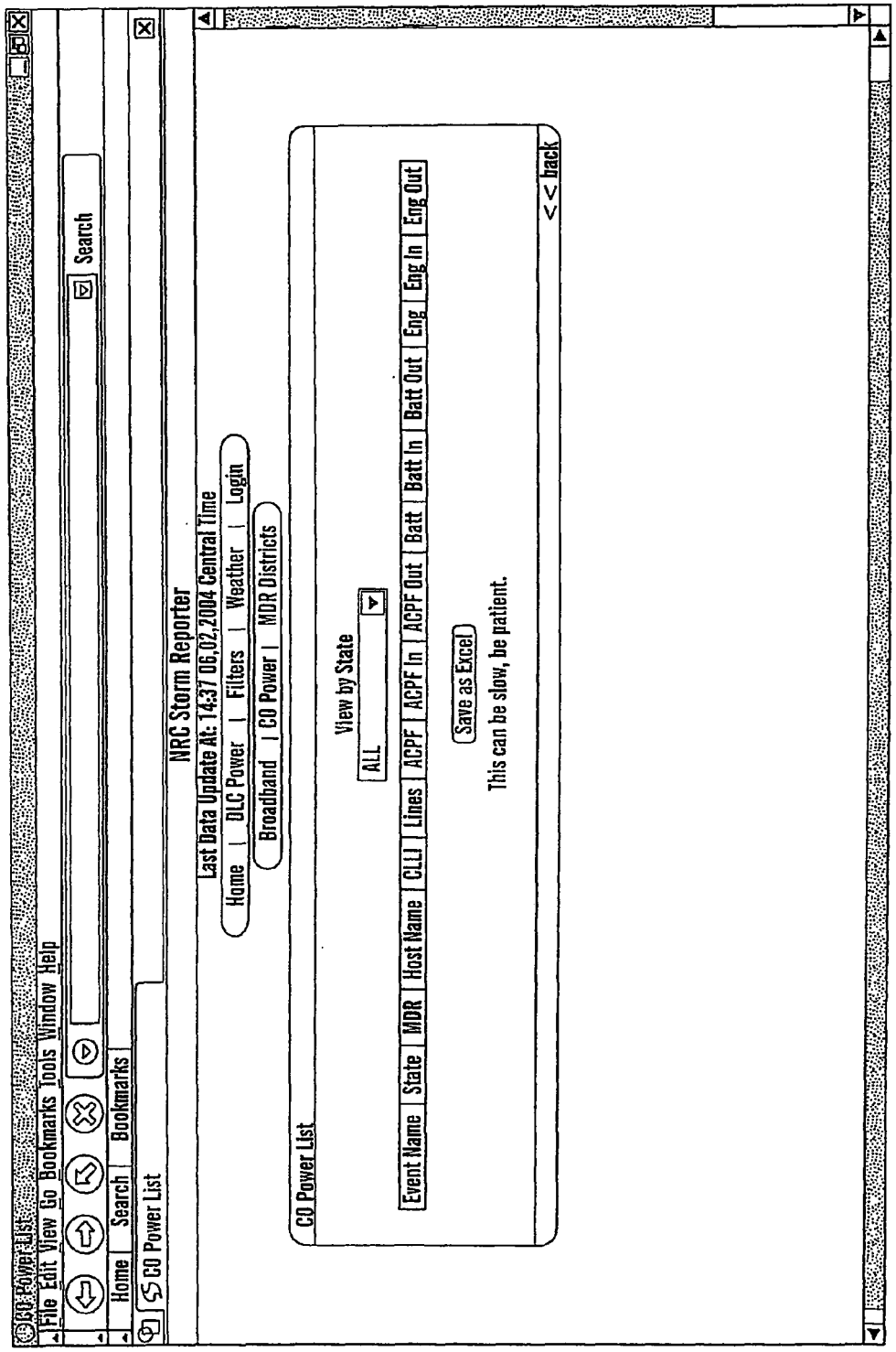
FIG. 10 is an exemplary user interface for viewing central offices on emergency power that have been selected to be included in a report.

FIG. 10 is an exemplary user interface for viewing central offices on emergency power that have been selected to be included in a report and is presented to the requester in response to the requester selecting the CO power navigation button 404 on FIG. 4. The CO power link, depicted in FIG. 10 displays offices on emergency power that have been selected to be included in the current report or in the report data. In exemplary embodiments, the alarm test group is able to search for offices on engines or batteries and select an insert button if the office is to be included in the report. For example, if a hurricane hits in Wilmington, N.C., but a power technician in Asheville, N.C. is performing a routine engine run, the Asheville site should not be included in the storm report.

Figure 11:
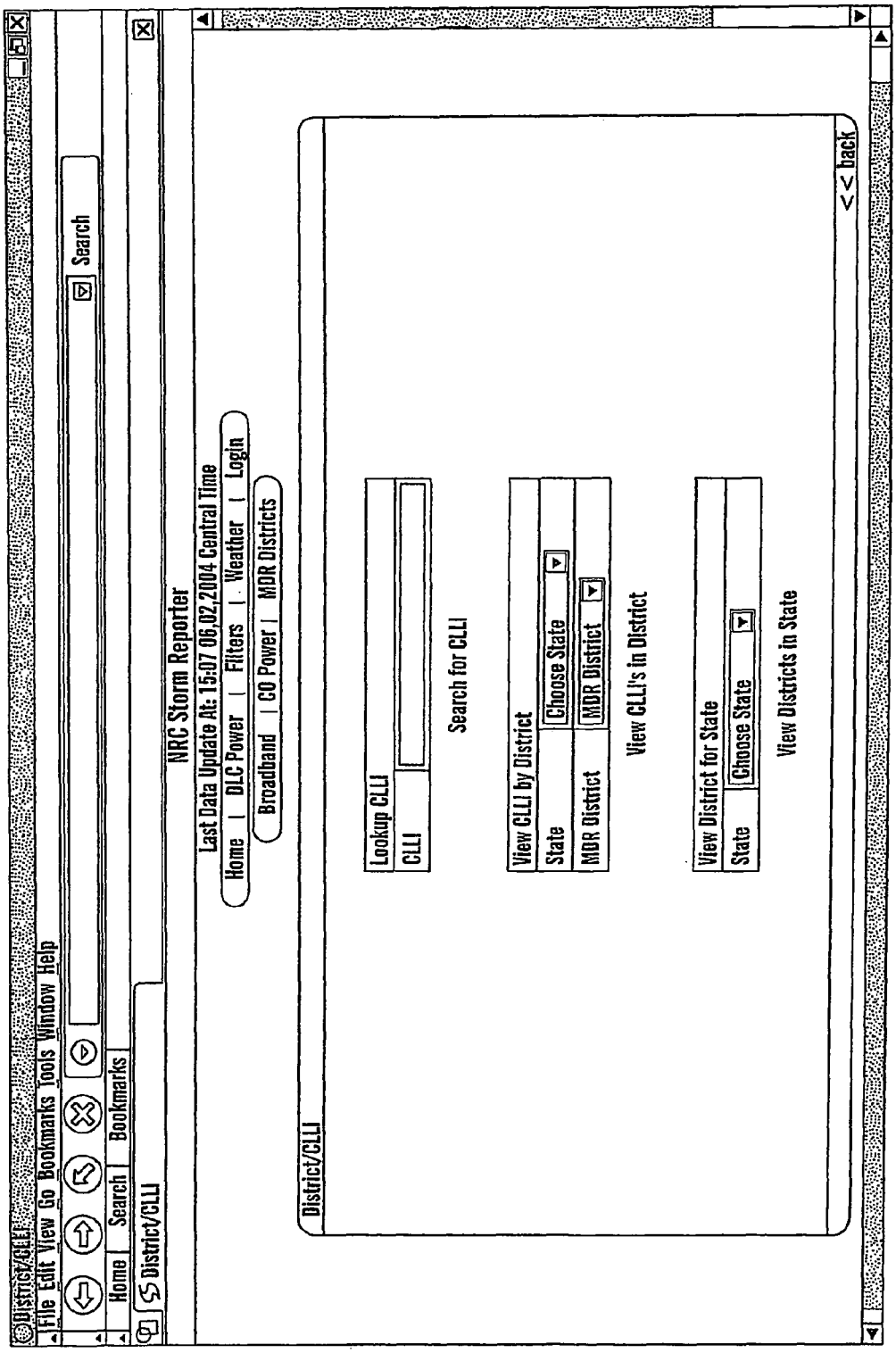
FIG. 11 is an exemplary user interface for allowing users to search for field work group (FWG) turf districts.

FIG. 11 is an exemplary user interface for allowing users to search for field work group (FWG) turf districts. The user interface depicted in FIG. 11 is presented to the requester when the requester selects the Mechanized Disaster Reporting District (MDR). A district is a geographic area defined by field work group management. District is the area of responsibility for that management organization districts navigation button 404 on FIG. 4. This user interface allows requesters to search for FWG turf district by CLLI, state or by listing all CLLI's for a district. In exemplary embodiments, the determination of turfs has been automated.

Figure 12:
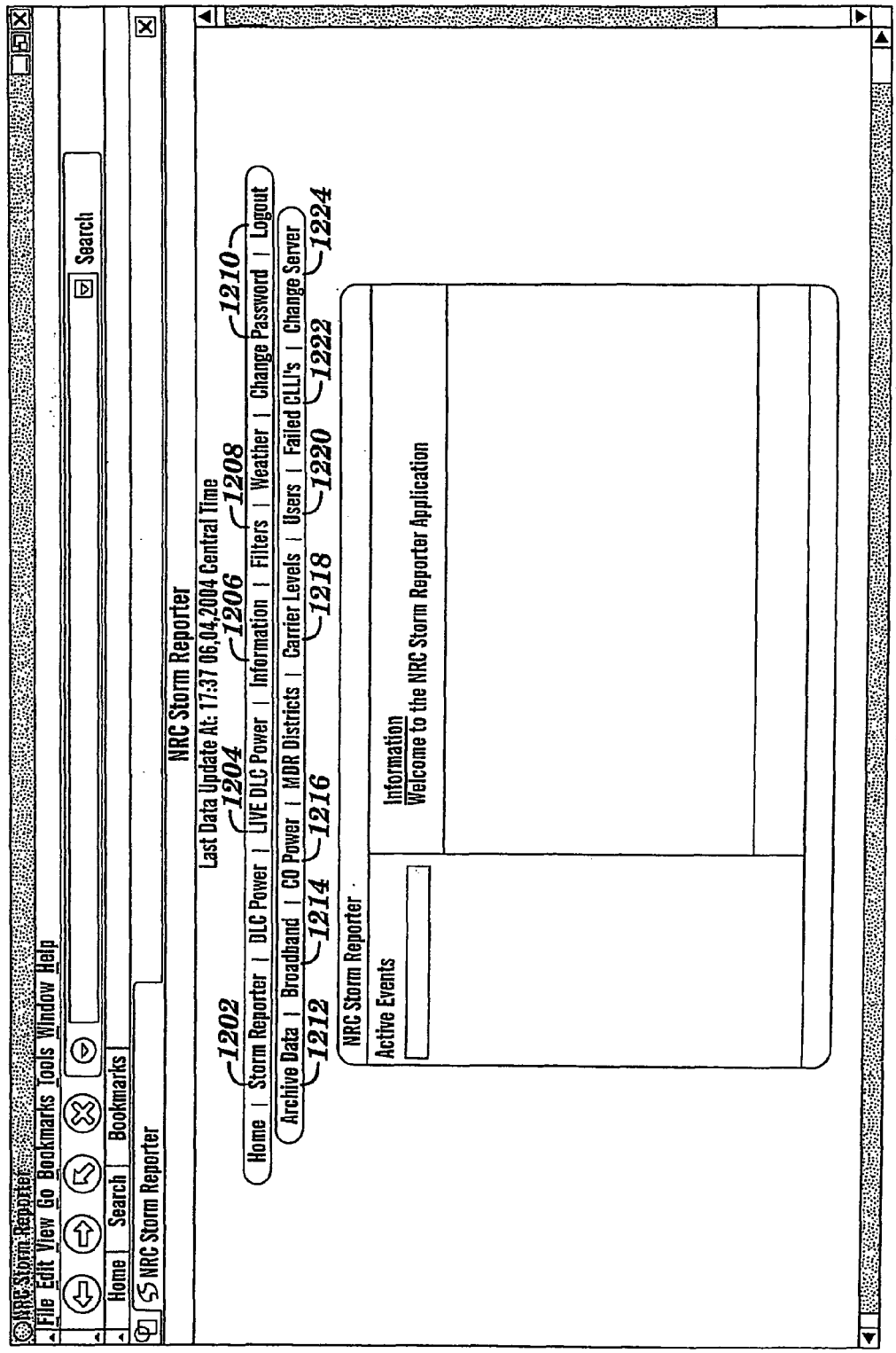
FIG. 12 is an exemplary user interface for advanced storm reporter functions only available to authorized users in exemplary embodiments.

FIG. 12 is an exemplary user interface for advanced storm reporter functions only available to authorized user in exemplary embodiments. The user interface depicted in FIG. 12 is presented to the requester when the requester selects the login navigation button 404 on FIG. 4 and successfully logs on (e.g., has an authorized password/user id). The selections from FIG. 12 include: a storm reporter option 1202; a live DLC power option 1204, an information option 1206 for updating the information section 406, a filter option 1208, a change password and logout option 1210, an archive data option 1212, a broadband option 1214, a CO power option 1216, a carrier level option 1218, a users option 1220, a failed CLLIs option 122 and a change server option 1224. The details of several of these options are discussed below in reference to FIGS. 13-19.

Figure 13:
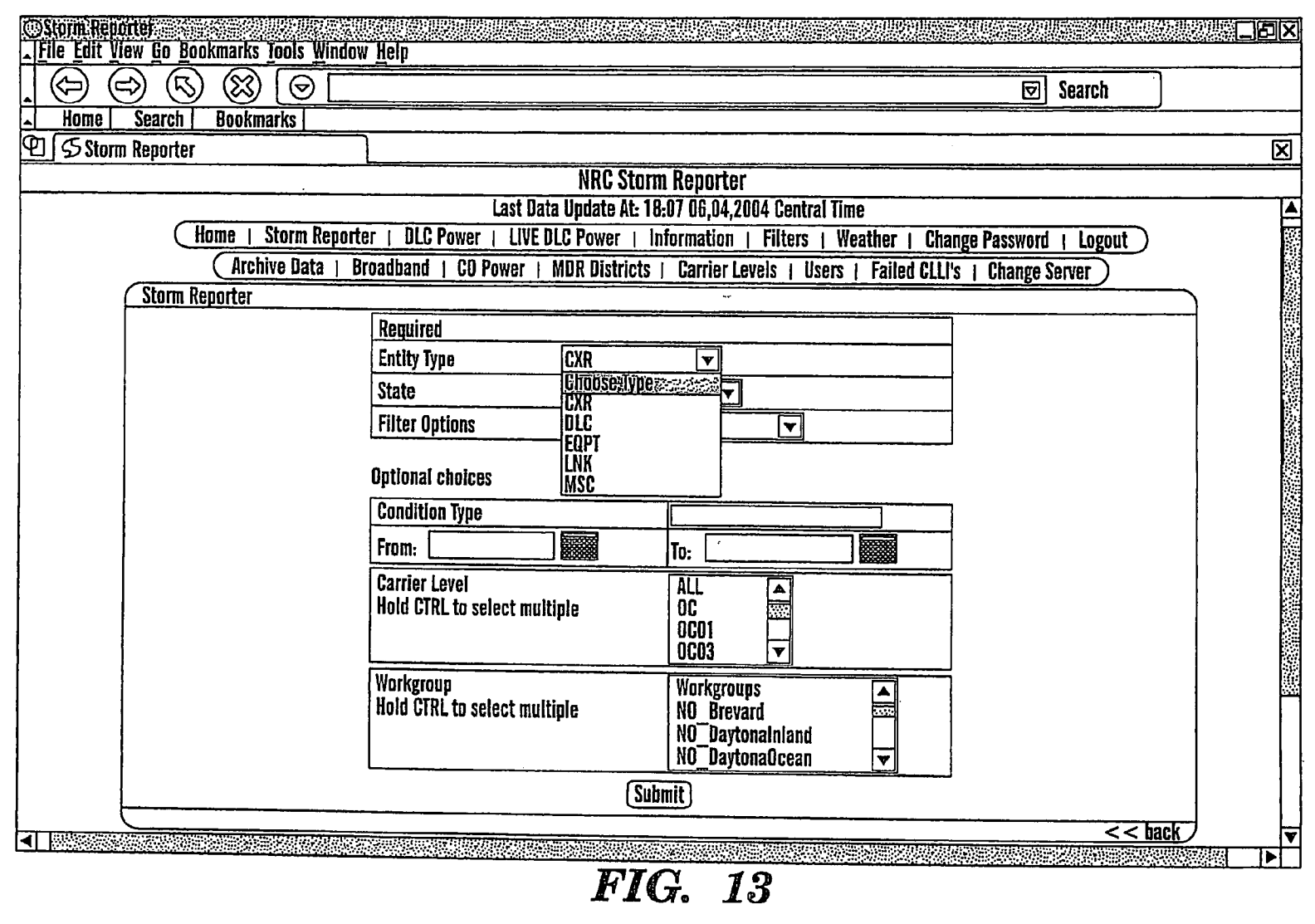

FIG. 13 is an exemplary user interface for searching alarms by entity type that is presented to the requester when the requester selects the storm reporter option 1202. The storm reporter link allows requestors to search alarms by entity type, such as, but not limited to: carrier (CXR), DLC, equipment (EQPT), link (LNK) and miscellaneous (MSC). The entity type may contain values such as, but not limited to, NMA carrier, DLC, or miscellaneous. The carrier level refers to the North American Digital/SONET Bandwidth Hierarchy OC3, OC12, OC48, OC192 etc. For example, the requester could select "show all Florida OC3 carrier alarms."

Figure 14:
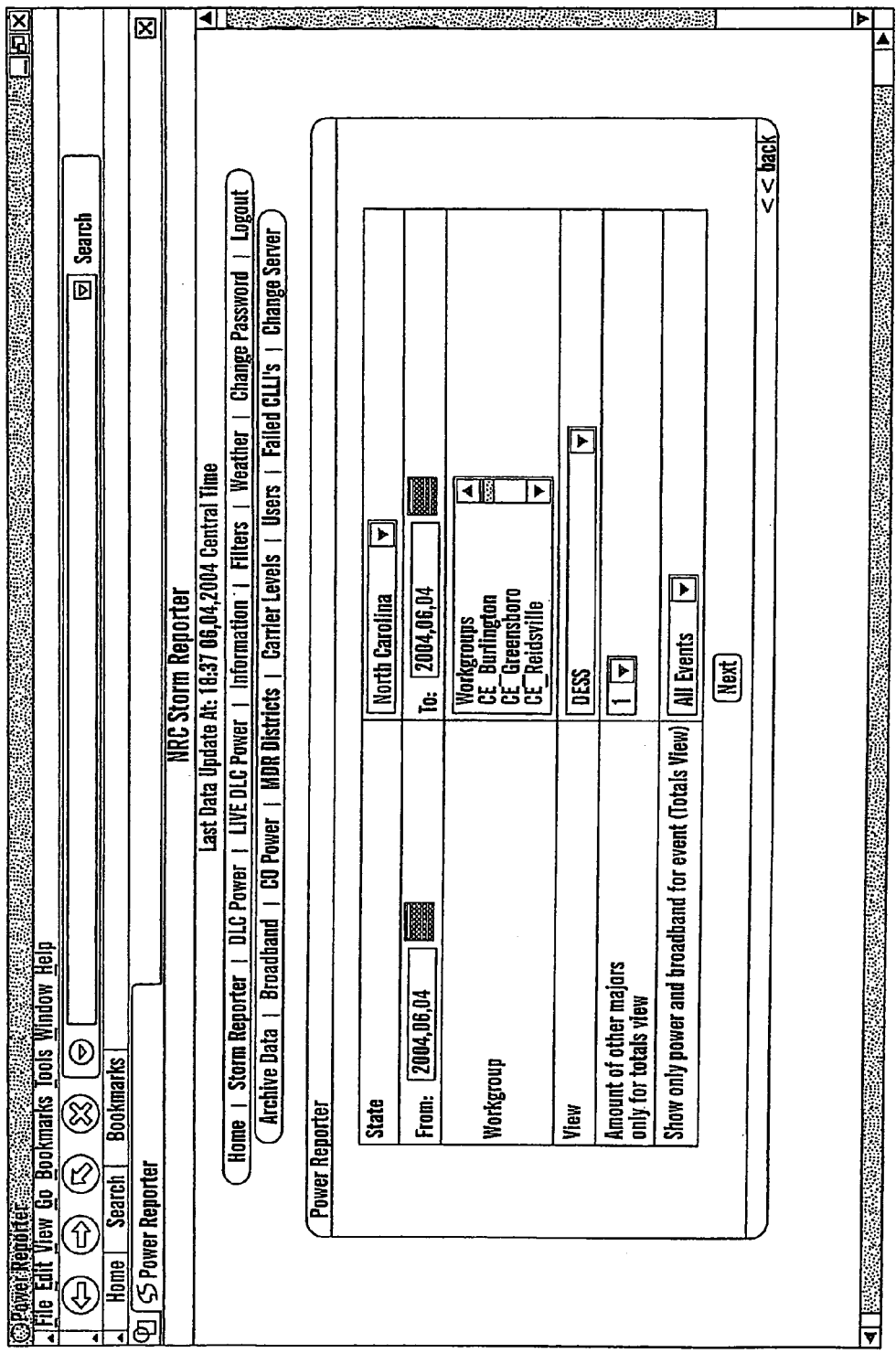
FIG. 14 is an exemplary user interface for viewing selected live DLC alarms.
Figure 15:
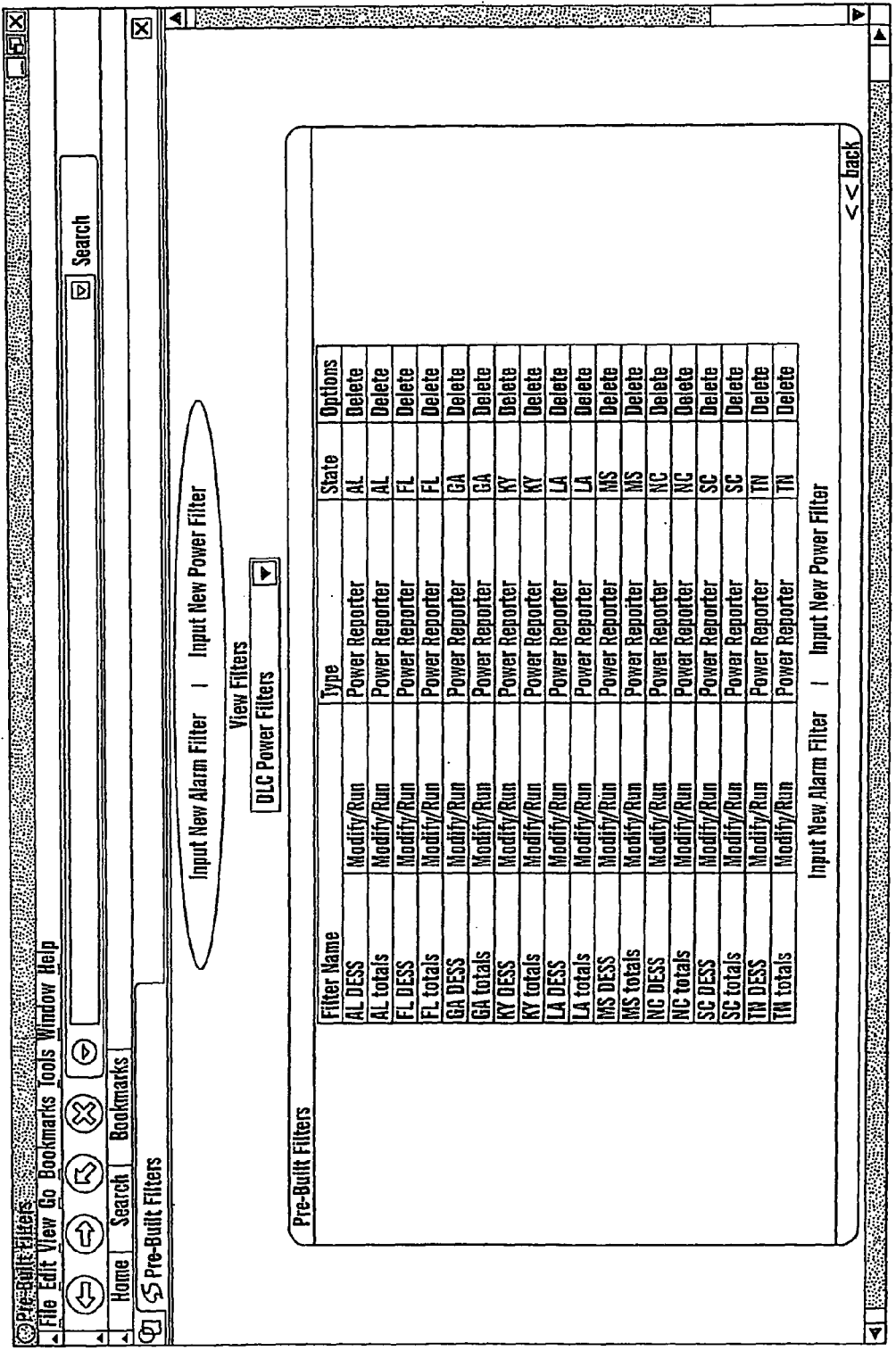
FIG. 15 is an exemplary user interface for viewing and creating filters/ports.

FIG. 14 is an exemplary user interface for viewing selected DLC alarms that is presented to the requestor when the requester selects the live DLC power option 1204 on the user interface in FIG. 12. The user interface depicted in FIG. 14 is utilized to view live DLC alarms on demand from an alarm data source 110 (e.g., Telcordia NMA) that is providing DLC alarms to the system. This provides the requester with a current view of alarms. FIG. 15 is an exemplary user interface for viewing and creating filters/reports that is presented to the requester when the requester selects the filters option 1208 on the user interface in FIG. 12.

Figure 16:
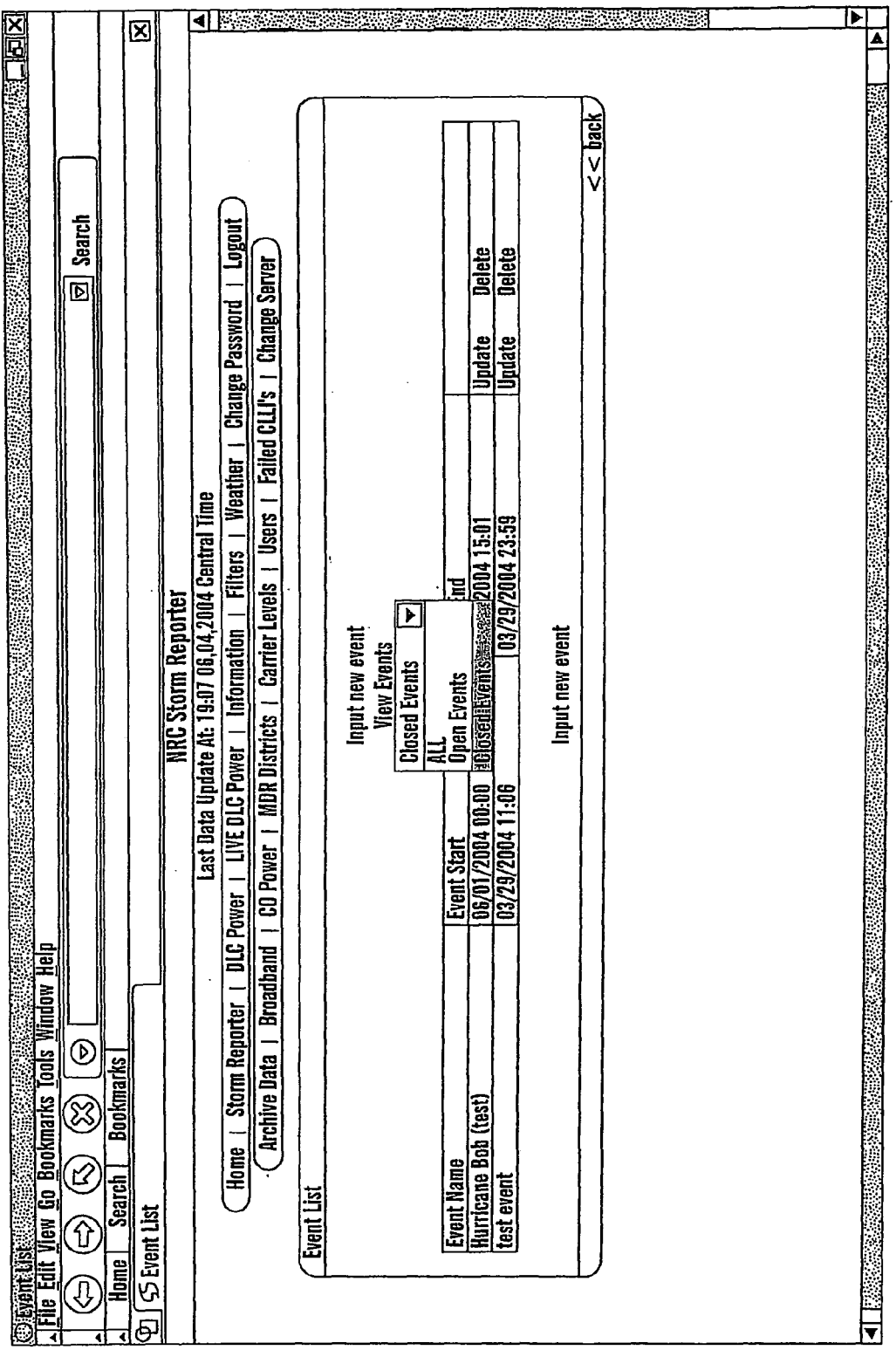
FIG. 16 is an exemplary user interface for viewing data relating to open and/or closed events and for accessing archived data.
Figure 17:
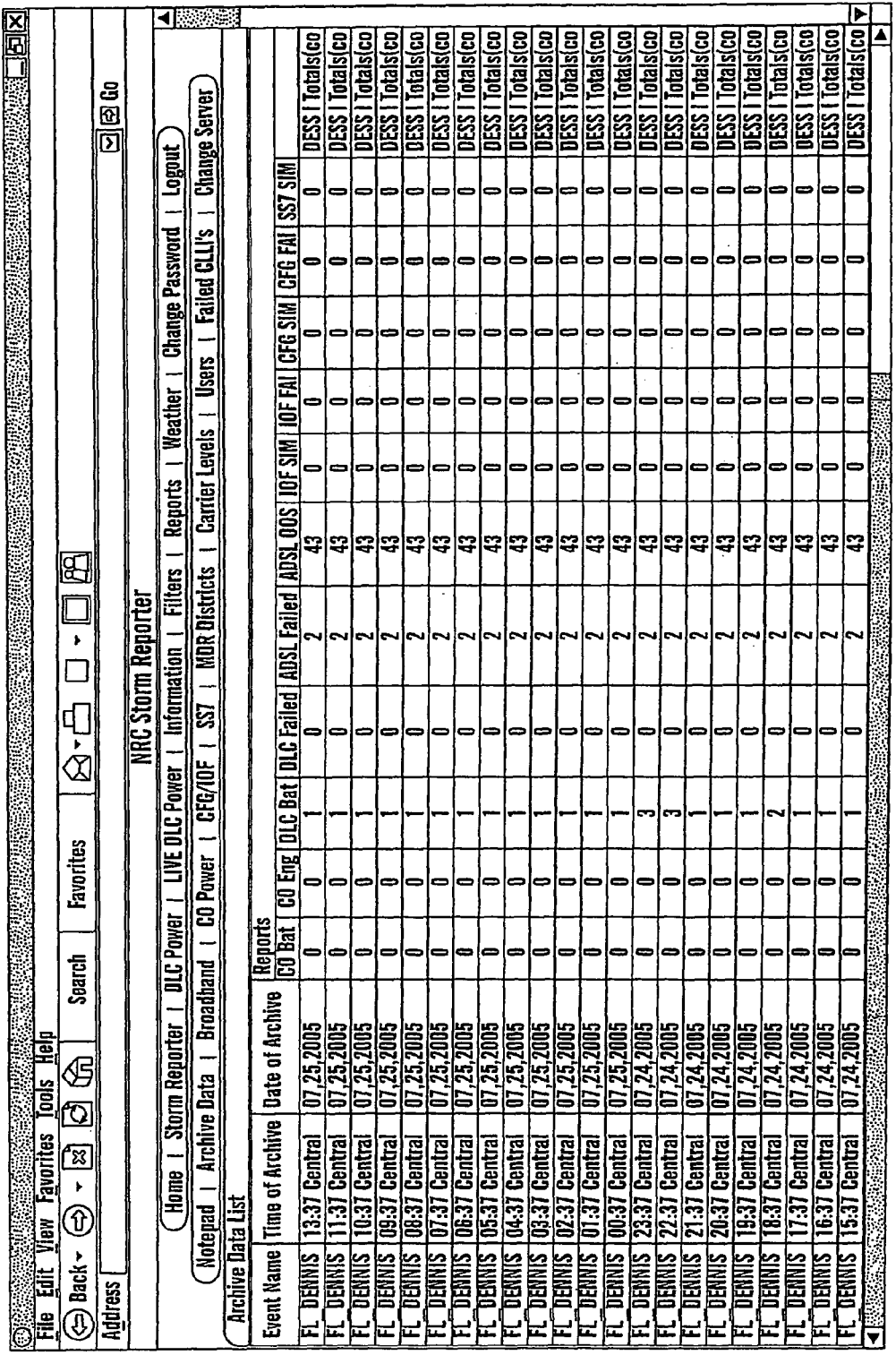
FIG. 17 is an exemplary user interface of archived data.

FIG. 16 is an exemplary user interface for viewing data relating to open and/or closed events that is presented to the requester when the requester selects the archive data option 112 from the user interface depicted in FIG. 12. The archive link allows the requester to view all events, view open events or to view closed events. Events may also be updated or deleted. In exemplary embodiments, the archive data is displayed in such a way that the requester can quickly see storm trends. For example, the user interface in FIG. 16 may be utilized to quickly answer the question "when was the peak of the storm and how many DLC sites and COs were without power at that time?" Data is saved hourly on active events. Totals view, DESS and DLC sites failed and on battery view are saved. Archived data also includes central office power, ADSL, SS7 and carrier information. FIG. 17 is an exemplary user interface for viewing archived data.

Figure 18:
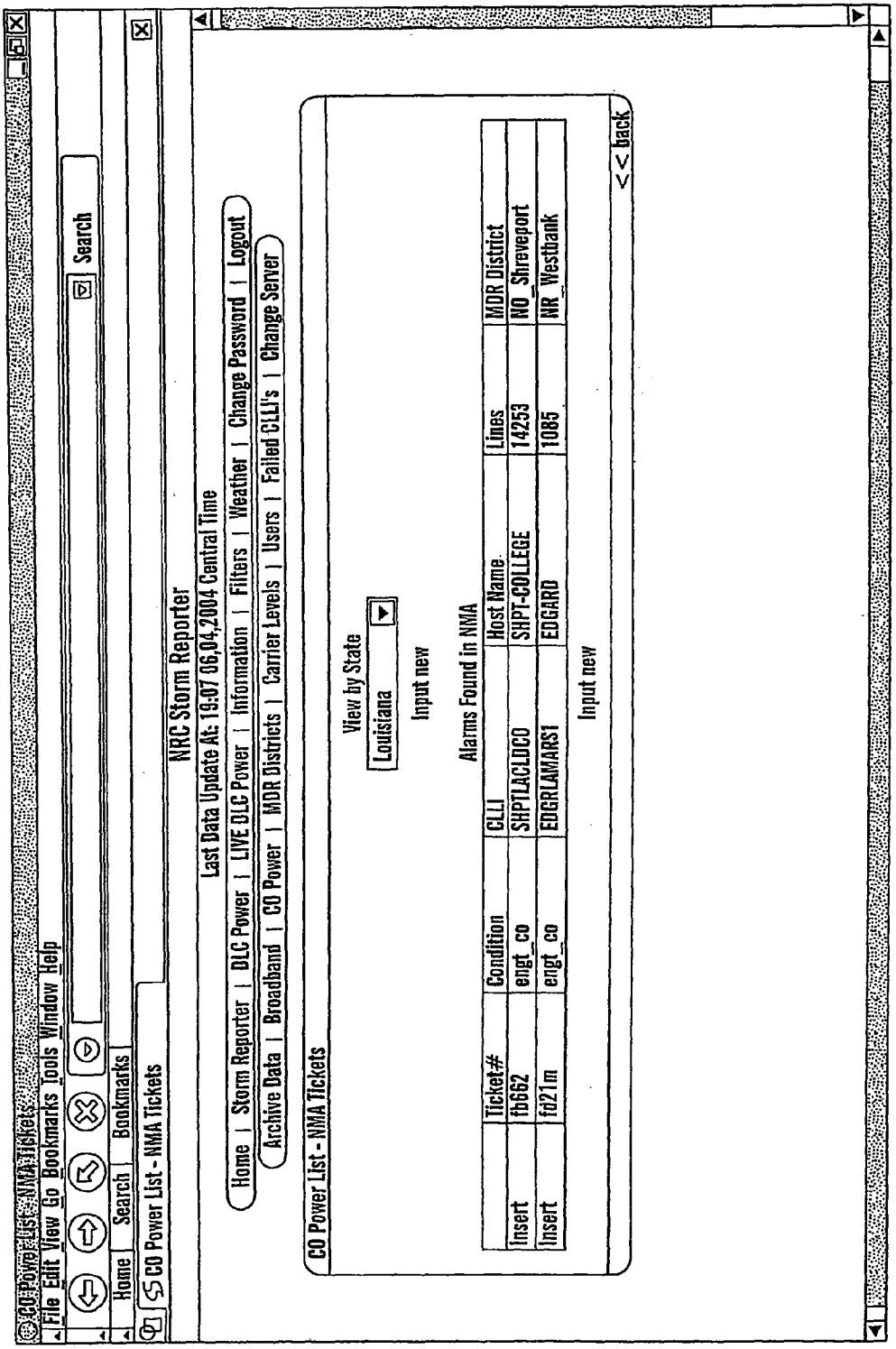
FIG. 18 is an exemplary user interface for inserting central office engine transfer and battery discharge alarms into a central office report.

FIG. 18 is an exemplary user interface for inserting central office engine transfer and battery discharge alarms into a central office report. The user interface depicted in FIG. 18 is presented to the requestor when the requester selects the CO power option 1216 from the user interface depicted in FIG. 12. The CO power page depicted in FIG. 18 allows requesters to view central office engine transfer data and battery discharge alarms and insert them (if due to the storm) into the CO power report (and into the report data).

Figure 19:
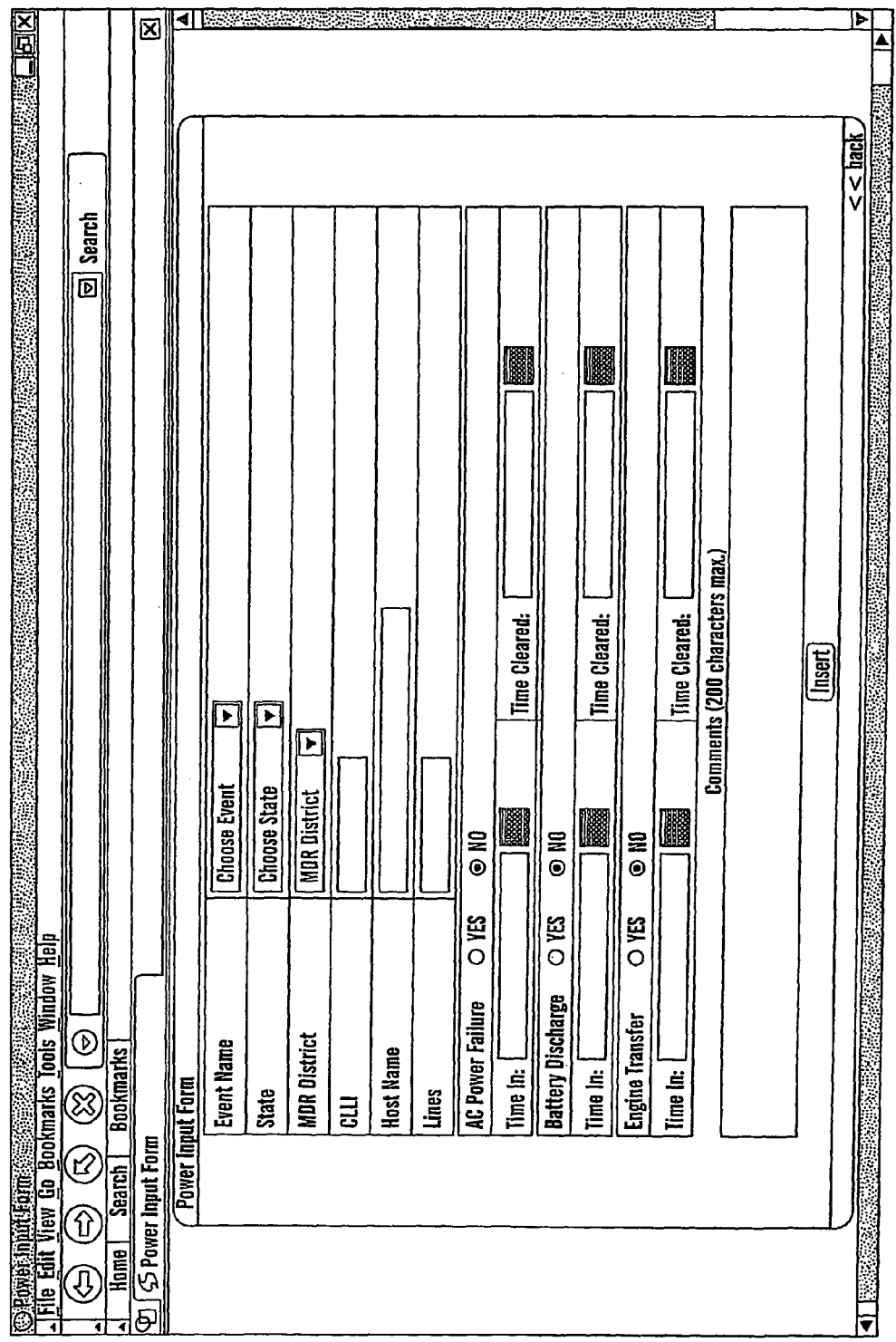
FIG. 19 is an exemplary user interface for manually entering central office engine transfer and battery discharge alarms for reporting.

FIG. 19 is an exemplary user interface for manually entering CO engine transfer and battery discharge alarms for reporting that is also presented to the requester when the requester selects the CO power option 1216 from the user interface depicted in FIG. 12. The CO power page also allows COs to be entered manually if they did not show up in the alarm data from the alarm data sources 110. For example, a requester may learn that an office with a manual start generator has been placed on generator power and should be included in the report. It can be entered via the user interface depicted in FIG. 19.

Figure 20:
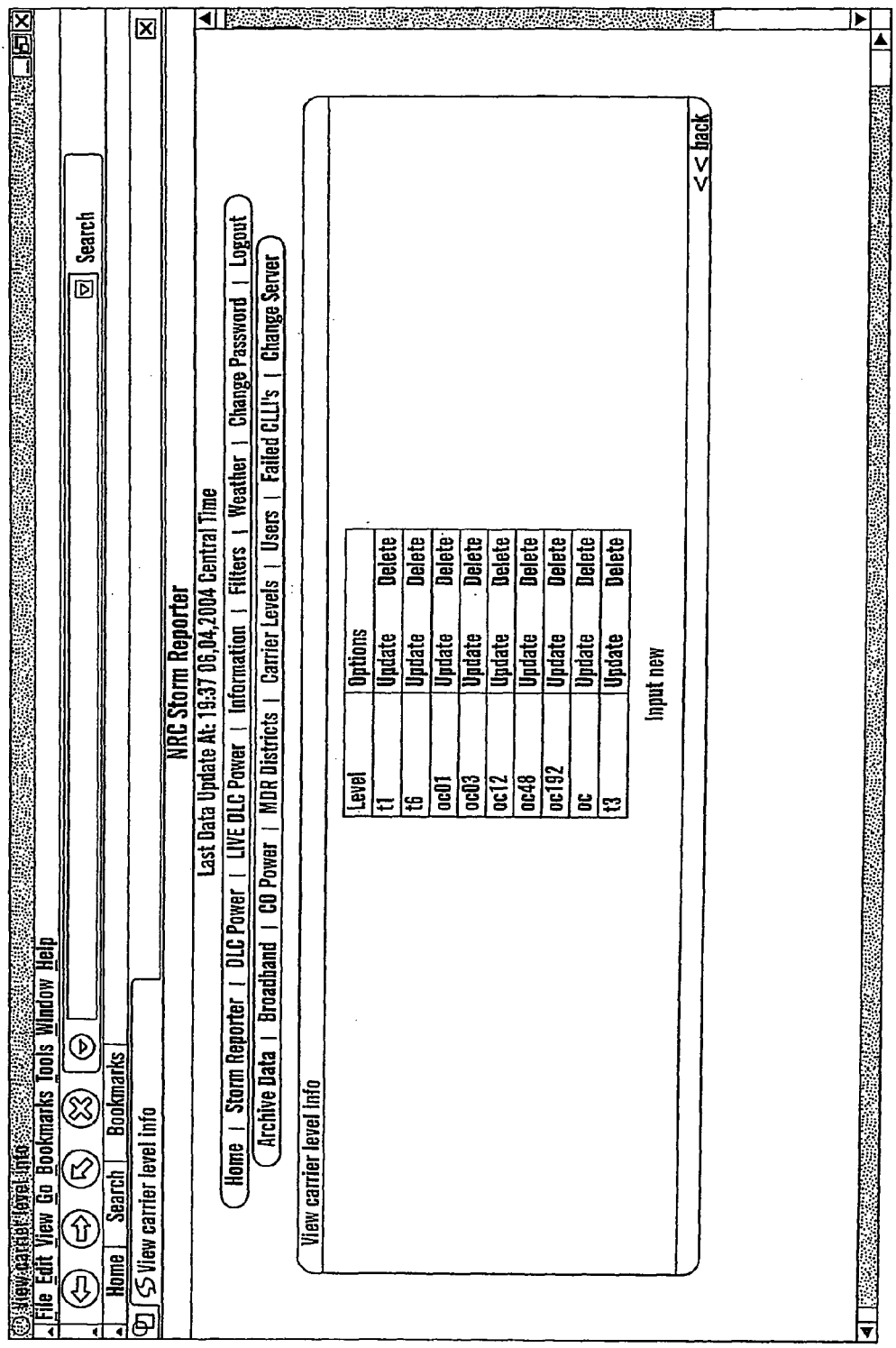
FIG. 20 is an exemplary user interface for updating and entering carrier levels.

FIG. 20 is an exemplary user interface for updating and entering carrier levels. The user interface depicted in FIG. 20 is presented to the requestor when the requestor selects the carrier levels option 1218 on the user interface depicted in FIG. 12.

Figure 21:
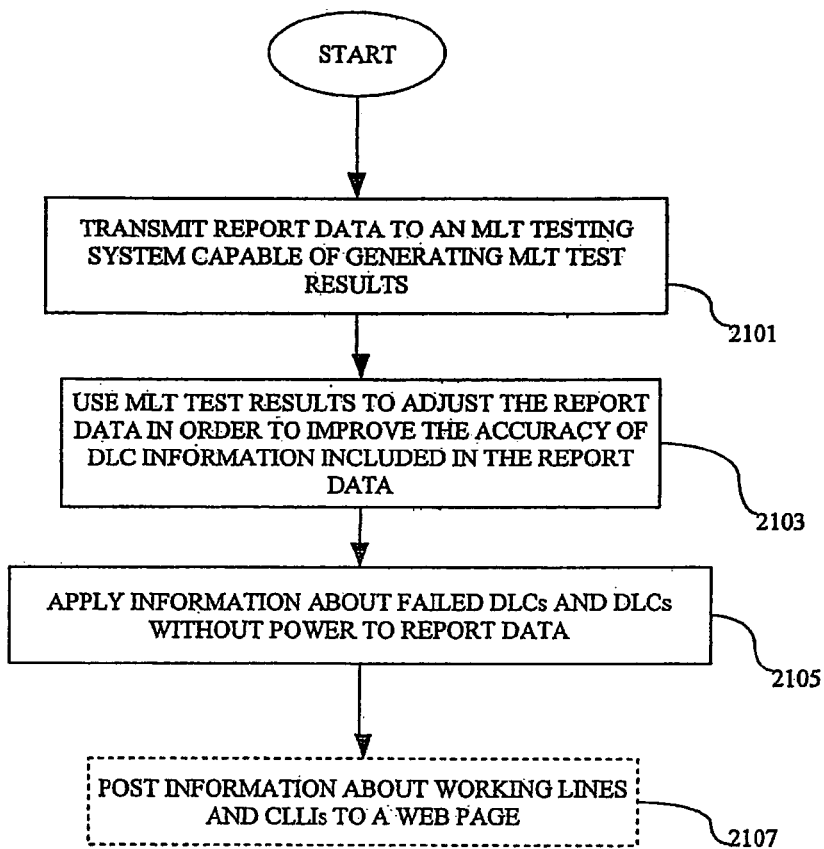
FIG. 21 is an exemplary flowchart setting forth a process by which mechanized loop test (MLT) test results are used to adjust the report data in order to improve the accuracy of digital loop carrier information included in report data.

FIG. 21 is an exemplary flowchart setting forth a process by which mechanized loop test (MLT) test results are used to adjust the report data in order to improve the accuracy of digital loop carrier information included in report data. The procedure commences at block 2101 where report data is transmitted to an MLT testing system capable of generating MLT test results. One example of a suitable MLT system is known as "Outtact" to those of ordinary skill in the relevant art. Illustratively, the report data specifies a quantity of DLCs on batteries and a quantity of DLCs that have failed. At block 2103, the MLT test results are used to adjust the report data in order to improve the accuracy of digital loop carrier information included in the report data. Illustratively, the MLT test results include information comprising "indeterminate CLLIs and working lines", "DLCs failed CLLIs and working lines", and "DLCs without power CLLIs and working lines". The information about failed DLCs and DLCs without power is applied to the report data (block 2105). Optionally, the information about working lines and CLLIs is posted to a web page (block 2107), thereby enabling facility service personnel to put working lines in NERS.

Figure 22:
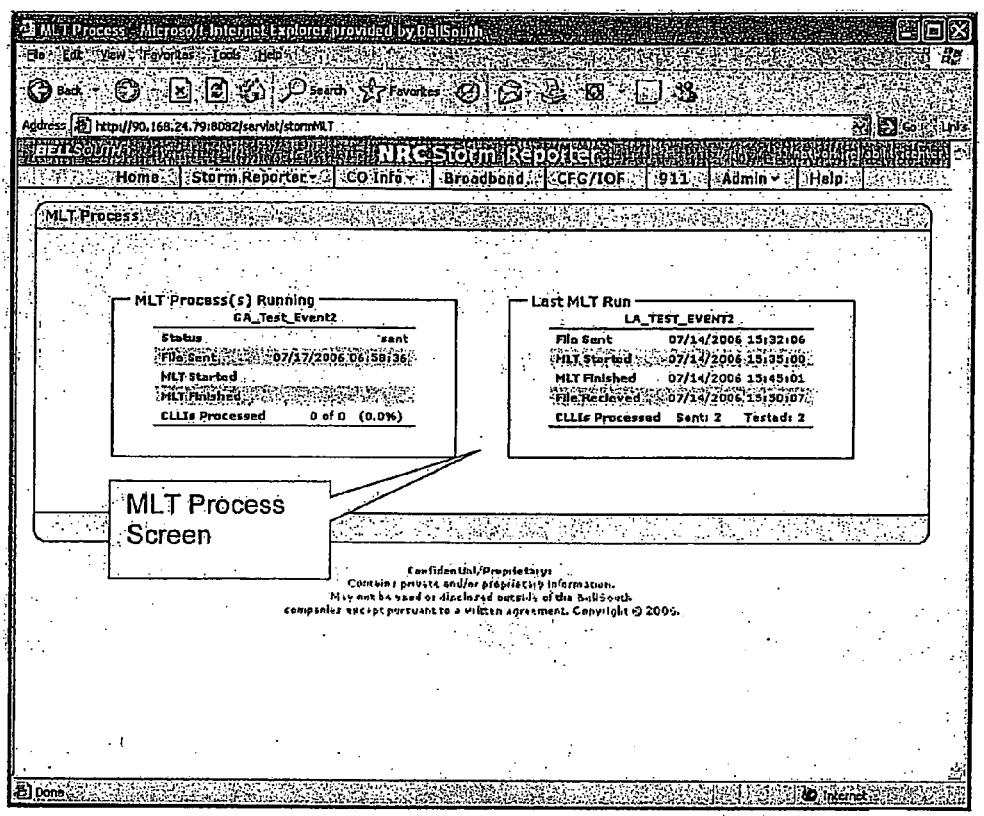
FIG. 22 is an exemplary user interface illustrating an MLT process display screen.

FIG. 22 is an exemplary user interface illustrating an MLT process display screen. The display screen displays information about one or more MLT processes that are currently running. A currently running MLT process is associated with a status indicator (such as "sent"), a first time indication specifying the time that the MLT process started, an optional second time indication specifying the time that the MLT process ended or is expected to end, and the number of CLLIs processed. The display screen also displays information about a previous execution of an MLT process. The previously executed MLT process is associated with a status indicator (such as "sent"), a first time indication specifying the time that the MLT process started, a second time indication specifying the time that the MLT process ended, and the number of CLLIs processed.

Figure 23:
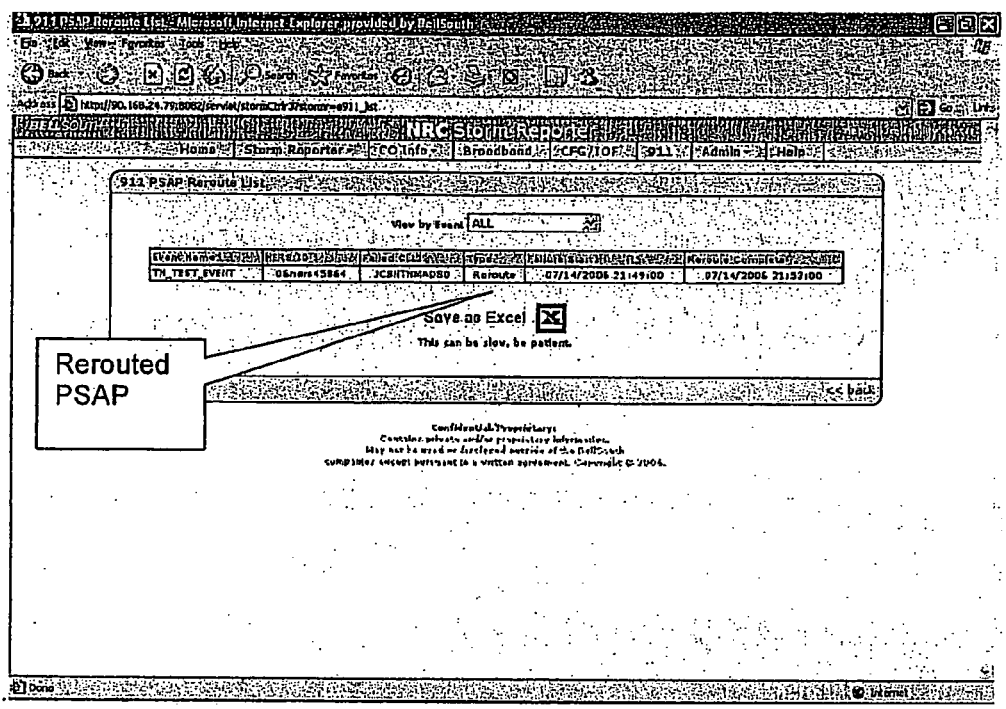
FIG. 23 is an exemplary user interface for collecting and displaying public safety answering point information.

FIG. 23 is an exemplary user interface for collecting and displaying public safety answering point (PSAP) information. This information specifies emergency 911 (E911) PSAPs that are out of service, as well as E911 PSAPs that have been rerouted to an alternate location.

Figure 24:
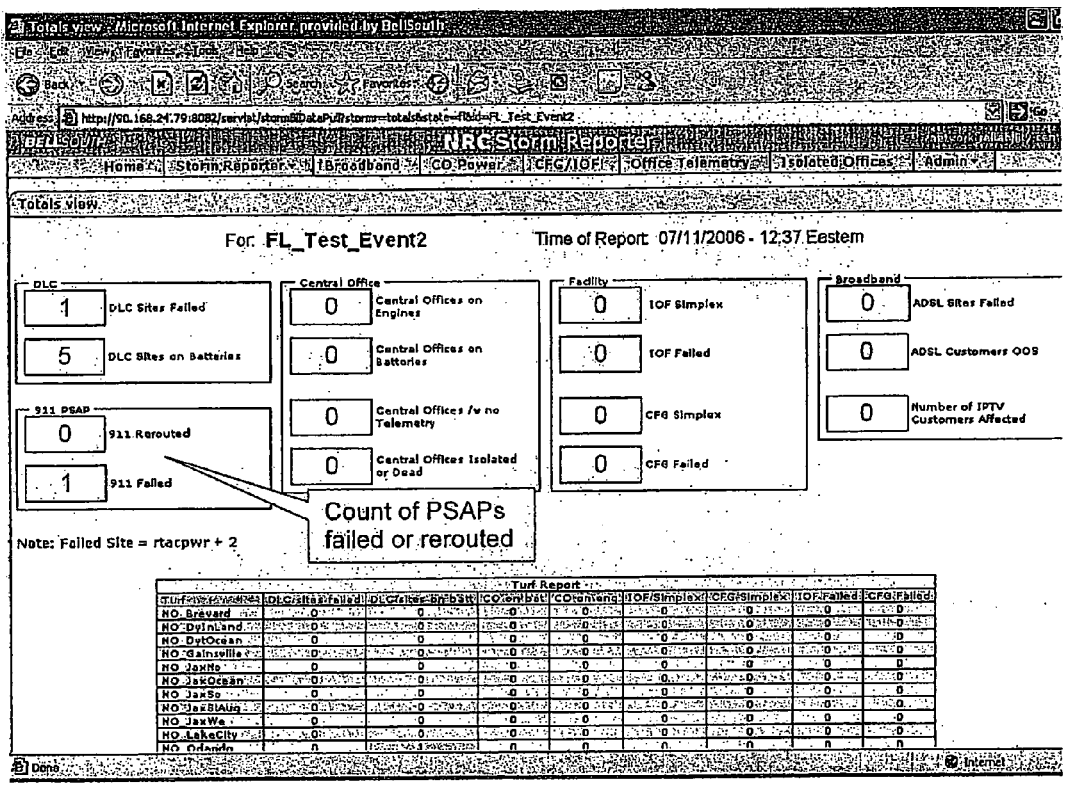
FIG. 24 is an exemplary user interface showing a count of public safety answering points that are failed or rerouted.

FIG. 24 is an exemplary user interface showing a count of public safety answering points that are failed or rerouted. In the present example, 1 DLC site has failed, 5 DLC sites are on batteries, no E911 PSAP sites have been rerouted, and one E911 PSAP site has failed.

Figure 25:
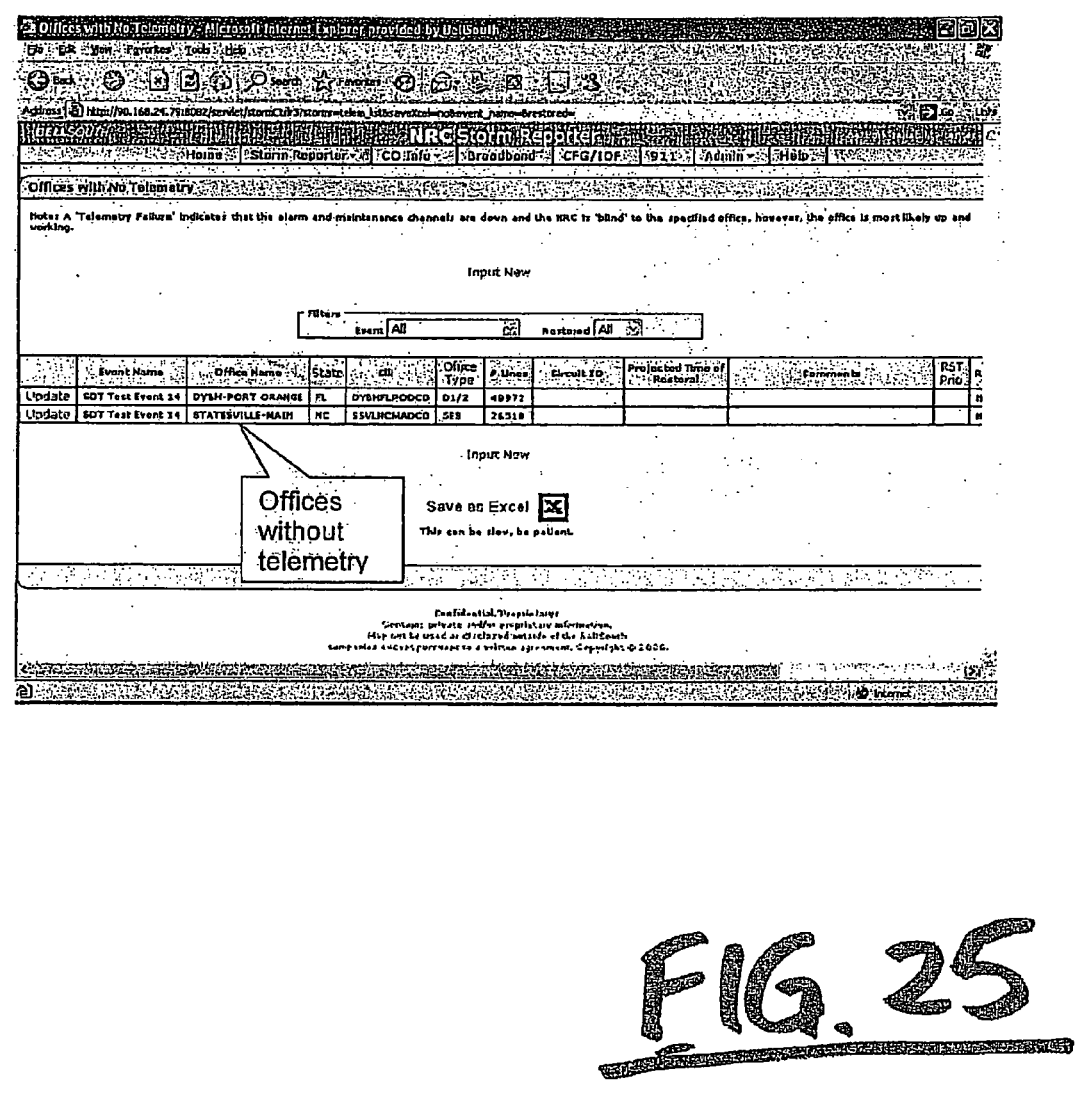

FIG. 25 is an exemplary user interface for displaying information about offices with failed telemetry. Failure may involve a loss of dial tone to a significant percentage of customers, and/or offices where all remote telemetry has failed.

Figure 26:
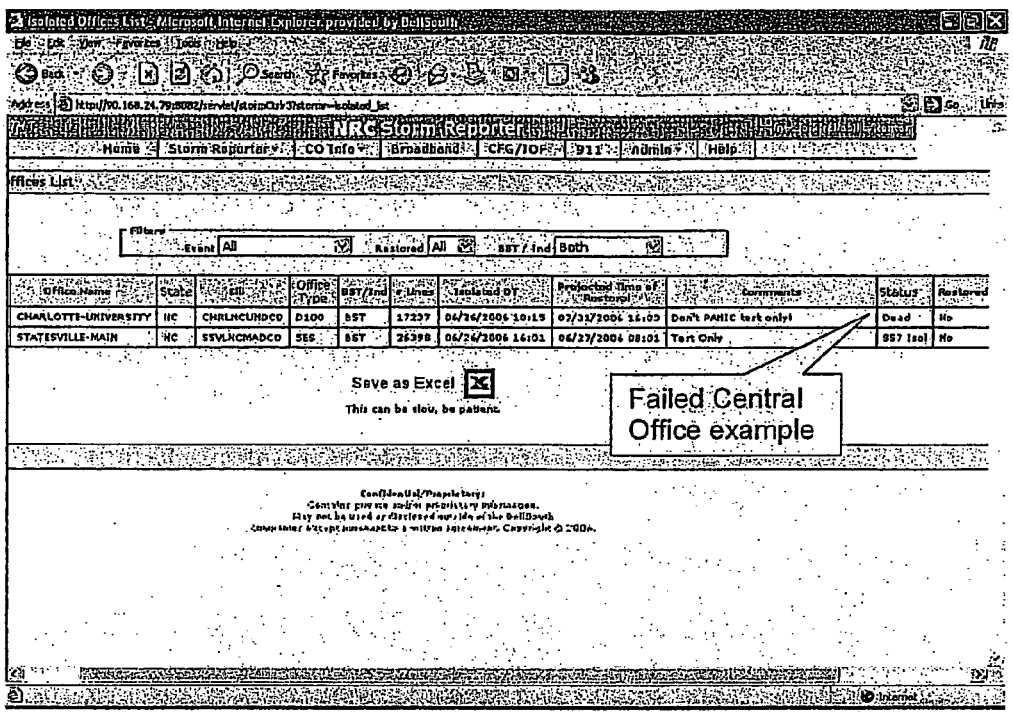
FIG. 26 is an exemplary user interface for displaying information about failed central offices.

FIG. 26 is an exemplary user interface for displaying information about failed central offices. For each of one or more failed central offices, an office name is displayed (CHARLOTTE-UNIVERSITY) and associated with a state (NC), a CLLI (CHRLNCUNDCO), an office type (D100), a BST/Ind indicator (BST), a number of lines (17237), a time and date at which the office has failed (Jun. 26, 2006 10:15), a projected time of restoration (Jul. 31, 2006 16:03), comments (Don't Panic-Test Only), status (dead), and a restored indicator (not restored or "no").

Figure 27:
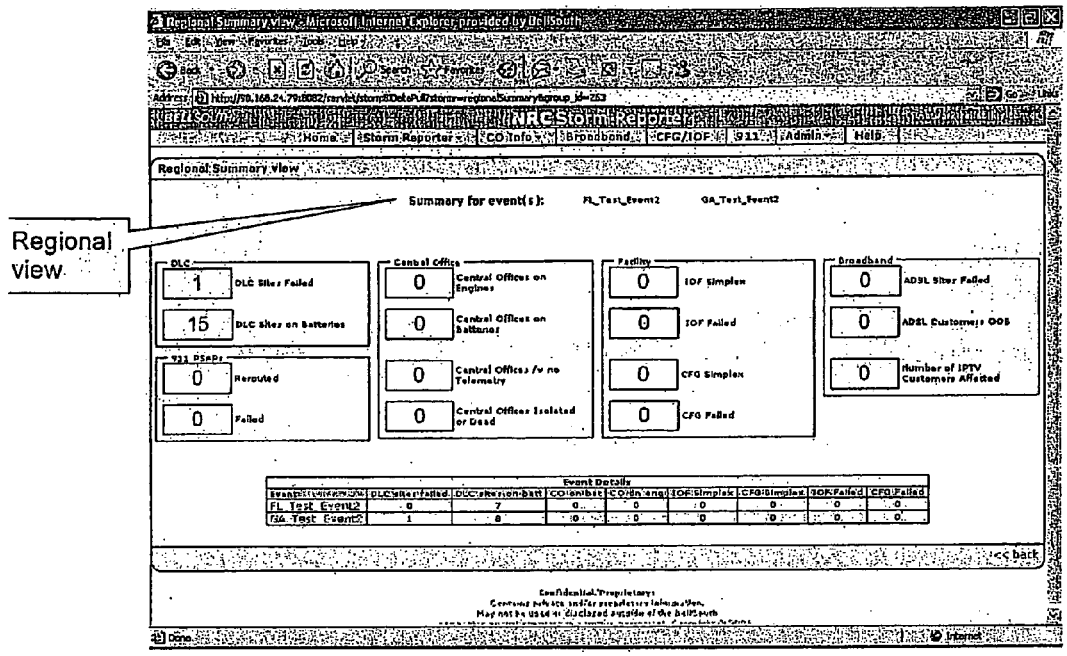
FIG. 27 is an exemplary user interface for displaying a regional summary of outage information.

FIG. 27 is an exemplary user interface for displaying a regional summary of outage information. When a storm affects multiple states, or if there are multiple storm-related events, a user can display a regional summary to display total alarm totals for various affected areas. In the present example, across all of the affected areas (illustratively including all of Florida and Georgia) 1 DLC site has failed, 15 DLC sites are on batteries, and no PSAPs have failed. Failure events are summarized for the states of Florida and Georgia. In Florida, no DLC sites have failed, but in Georgia, one DLC site has failed. In Florida, 7 DLC sites are on batteries, and in Georgia, 8 DLC sites are on batteries, yielding a total of 15 DLC sites on batteries.

Figure 28:
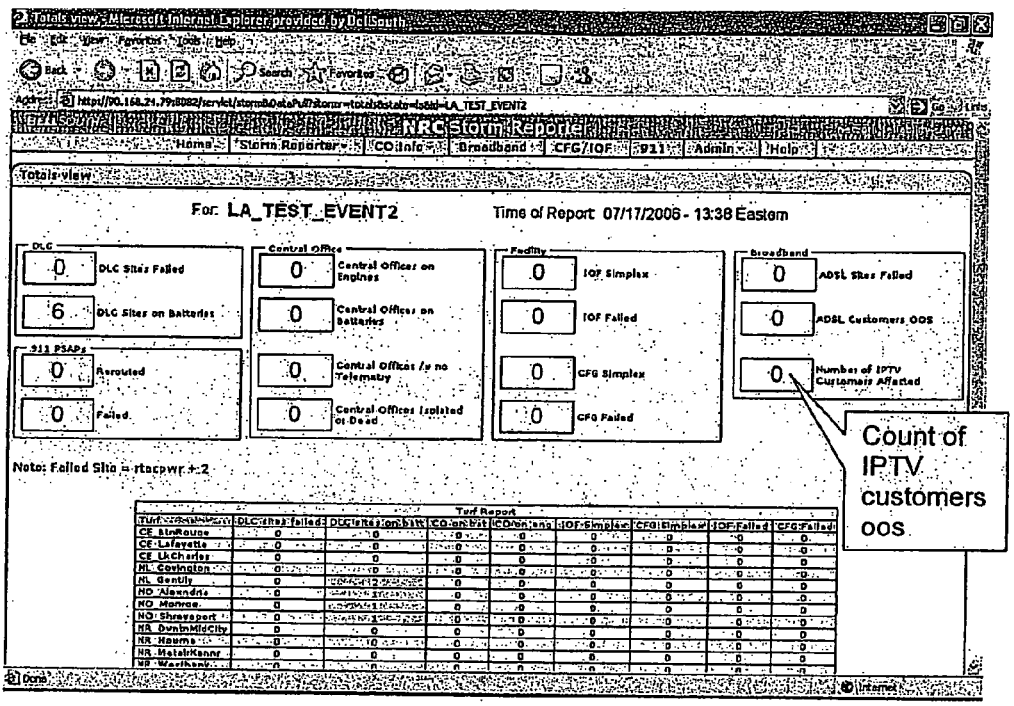
FIG. 28 is an exemplary user interface for displaying a count of IPTV customers affected by an outage.

FIG. 28 is an exemplary user interface for displaying a count of IPTV customers affected by an outage. In the present example, no IPTV customers are affected by failures. However, there are 6 DLC sites running on batteries.

The user interfaces depicted and described herein are exemplary in nature, and many other user interfaces and data arrangements may be implemented based on the alarm data being received from alarm data sources 110 and on the requestor requirements. In exemplary embodiments the alarm data and report data are stored in databases (e.g., a relational database) that provide tools for manipulating and presenting data to the requester.

Exemplary embodiments may be utilized to provide equipment status to any network provider (e.g., telephone company). Exemplary embodiments may not only be utilized to control and advise the network provider team during times of disasters, but they can also be used individually when severe weather is in any given area. Reports can be run at the request of any individual that has permission to view the data. In addition, exemplary embodiments provide for the storage of historical data for queries that may be required later for reports to government agencies.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing network equipment status information, the method comprising:
    receiving alarm data for an event from a plurality of sources, the alarm data including a plurality of alarm records each including a site identifier;
    processing the alarm data to create report data, the processing including assigning an attribute of failed to each of the site identifiers that are specified in more than a threshold number of the alarm records, wherein the report data comprises at least digital loop carrier information;
    transmitting the report data to a mechanized loop test (MLT) testing system capable of generating MLT test results; and
    using the MLT test results to adjust the digital loop carrier information included in the report data, wherein the digital loop carrier information specifies a quantity of digital carrier loop lines that are out of service.

2. The method of claim 1 wherein:
    each of the alarm records further includes an alarm type, a site type, an equipment type, a date and a time; and
    the processing further includes summing alarm occurrences by one or more of the site identifier, the site type, the alarm type, the equipment type, the date, the time and the failed attribute.

3. The method of claim 2 wherein each of the alarm types includes one or more of out of service, power outage, on batteries, on engines, and critical.

4. The method of claim 2 wherein each of the site types includes one or more of central office, customer and carrier.

5. The method of claim 2 wherein each of the equipment types includes one or more of digital loop carrier (DLC), signaling system seven (SS7), asymmetrical digital subscriber line (ADSL), digital subscriber line access multiplexer (DSLAM), and simplex.

6. The method of claim 1 wherein the alarm data for each of the alarm records is received and processed within a specified period of time from when the alarm records were created.

7. The method of claim 1 wherein the alarm data for each of the alarm records is received and processed in an automated fashion and on a periodic basis.

8. The method of claim 1 wherein the site identifier corresponds to a geographic region and the processing further includes summing alarm records by geographic region.

9. The method of claim 1 wherein:
    each of the site identifiers correspond to one or more of a DLC site, an ADSL site and a central office site;
    each of the alarm records further includes an alarm type corresponding to one or more of out of service, outage, on batteries and on engines; and
    the processing includes calculating totals of the number of DLC sites with the attribute of failed, the number of DLC sites with an alarm type of on batteries, the number of ADSL sites with the attribute of failed, the number of ADSL sites with the alarm type of out of service, the number of ADSL subscribers affected at the ADSL sites, the number of central offices with the alarm type of on engines, and the number of central offices with the alarm type of on batteries.

10. The method of claim 1, further comprising transmitting the report data to a requester at a user system, wherein the requestor accesses the report data via a user interface screen.

11. The method of claim 1 further comprising storing the report data in a storage medium accessible by a requester at a user system.

12. A system for providing network status information, the system comprising:
    a storage device; and
    a processor in communication with the storage device, the processor including instructions for facilitating:
    receiving alarm data for an event from a plurality of sources, the alarm data including a plurality of alarm records each including a site identifier;
    processing the alarm data to create report data, the processing including assigning an attribute of failed to each of the site identifiers that are specified in more than a threshold number of the alarm records; wherein the report data comprises at least digital loop carrier information;
    storing the report data on the storage device;
    transmitting report data to a mechanized loop test (MLT) testing system capable of generating MLT test results; and
    using the MLT test results to adjust digital loop carrier information included in the report data, wherein the digital loop carrier information specifies a quantity of digital carrier loop lines that are out of service.

13. The system of claim 12 wherein the processor and storage device are located on a user device and the receiving is via a network.

14. The system of claim 12 wherein the alarm data is received via a network.

15. The system of claim 12 wherein the alarm data is stored on the storage device.

16. The system of claim 12 wherein the storage device and the processor are in communication via a network.

17. A computer program product for providing network status information, the computer program product comprising a storage medium readable by a processing circuit and storing instructions for execution by the processing circuit for facilitating a method comprising:
    receiving alarm data for an event from a plurality of sources, the alarm data including a plurality of alarm records each including a site identifier; and
    processing the alarm data to create report data, the processing including assigning an attribute of failed to each of the site identifiers that are specified in more than a threshold number of the alarm records, wherein the report data comprises at least digital loop carrier information; and transmitting the report data to a mechanized loop test (MLT) testing system capable of generating MLT test results; and using the MLT test results to adjust the digital loop carrier information included in the report data, wherein the digital loop carrier information specifies a quantity of digital carrier loop lines that are out of service.

18. The computer program product of claim 17 wherein:
each of the alarm records further includes an alarm type, a site type, an equipment type, a date and a time; and site identifier, the site type, the alarm type, the equipment type, a date, a time; and
the processing further includes summing alarm occurrences by one or more of the failed attribute.

19. The computer program product of claim 17 wherein:
each of the site identifiers correspond to one or more of a DLC site, an ADSL site and a central office site;
each of the alarm records further includes an alarm type corresponding to one or more of out of service, outage, on batteries and on engines; and
the processing includes calculating totals of the number of DLC sites with the attribute of failed, the number of DLC sites with an alarm type of on batteries, the number of ADSL sites with the attribute of failed, the number of ADSL sites with the alarm type of out of service, the number of ADSL subscribers affected at the ADSL sites, the number of central offices with the alarm type of on engines, and the number of central offices with the alarm type of on batteries.

20. The computer program product of claim 17, further comprising transmitting the report data to a requestor at a user system, wherein the requestor accesses the report data via a user interface screen.

* * * * *